(12) United States Patent  
Swift et al.

(10) Patent No.: US 7,957,019 B2  
(45) Date of Patent: Jun. 7, 2011

(54) METHOD AND APPARATUS FOR MANAGING PRINTING DEVICES

(75) Inventors: Steven Swift, Buckinghamshire (GB); James Brown, London (GB); Kuljinder Samrah, West Midlands (GB); Maurice Beelen, Weert (NL); Ron Coolen, Rosmalen (NL); Bersselaar Harrie van den, Rijswijk Zh (NL); Mark Boelhouwer, Vught (NL)

(73) Assignee: Ricoh Europe plc, London (GB)

( * ) Notice: Subject to any disclaimer, the term of this patent is extended or adjusted under 35 U.S.C. 154(b) by 1421 days.

(21) Appl. No.: 11/368,459

(22) Filed: Mar. 7, 2006

(65) Prior Publication Data

US 2006/0221387 A1    Oct. 5, 2006

(51) Int. Cl.
  *G06F 15/00* (2006.01)
  *G06F 15/177* (2006.01)
(52) U.S. Cl. .................................. 358/1.15; 709/220
(58) Field of Classification Search ............... 358/1.15, 358/1.13, 1.14, 1.16, 1.1; 709/220, 224, 709/229, 227, 203, 206, 245; 399/397, 16, 24, 25, 26; 725/114, 117, 144; 340/649, 468.2, 571; 370/254, 245

See application file for complete search history.

(56) References Cited

U.S. PATENT DOCUMENTS

2002/0078183 A1* 6/2002 Helms ........................ 709/220

* cited by examiner

*Primary Examiner* — Saeid Ebrahimi Dehkordy
(74) *Attorney, Agent, or Firm* — Dickstein Shapiro LLP

(57) ABSTRACT

A process of managing printing devices at distributed sites, carried out by a contractor for a client. A database portal is provided which is continuously accessible provides a visual display of the performance of the printing devices, and includes the usage and cost of using the printing devices. The database is regularly updated. The contractor regularly monitors the status and usage of the printing devices and associated software and services through the database and uses the information in the database to optimize performance of the printing devices, including phasing in and out printing devices of different manufacturers.

12 Claims, 34 Drawing Sheets

| | | | |
|---|---|---|---|
| Cost Base | Calculation date Cost base | jan-03 | (fill out date: xx/2003) |
| | Period for registration in Caspar | ☐<br>☐ | Cost registration per month<br>Cost registration per year |
| | Presentation to customer | ☐<br>☐<br>☐ | Present costs to customer per month<br>Present costs to customer per quarter<br>Present costs to customer per year |
| | Total costs | ☐<br>☐ | Present "standard" cost calculation (per product and per cost element)<br>Present additional spilt in costs and volume, split for Color and B/W |
| | Depreciation Copiers / MFD | ☐<br>☐<br>☐<br>☐ | Register remaining book value<br>Depreciation period 3 years<br>Depreciation period 4 years<br>Depreciation period 5 years |
| | Depreciation Printers | ☐<br>☐<br>☐<br>☐ | Register remaining book value<br>Depreciation period 3 years<br>Depreciation period 4 years<br>Depreciation period 5 years |
| | Depreciation Faxes | ☐<br>☐<br>☐<br>☐ | Register remaining book value<br>Depreciation period 3 years<br>Depreciation period 4 years<br>Depreciation period 5 years |
| | Yield color use (in %) | | LOW yield user<br>MEDIUM yield user<br>HIGH yield user |
| | Printer Service Costs (per month)<br>for calculating cost base | | Inkjet printers (b/w)<br>Inkjet printers (color)<br>laserprinters (b/w)<br>laserprinters (color) |
| Proposal | Start date proposal | jan-03 | (linked to "calculation date cost base") |
| | Contract in months | | number of months |
| | Total volume | ☐ | Similar to current volume<br>Different from current volume (fill out volume) |
| | New solution | ☐ | Replace all rental/leasing obligations per expiration date |
| | | ☐<br>☐ | Replace purchased copiers/MFD's per depreciation date<br>Replace purchased copiers/MFD's yearly on anniversary date of contract (avg. 6 months early)<br>Replace purchased copiers/MFD's not later than (fill out date) |
| | | ☐<br>☐ | Replace purchased Printers per depreciation date<br>Replace purchased Printers yearly on anniversary date of contract (avg. 6 months early)<br>Replace purchased Printers not later than (fill out date) |
| | | ☐<br>☐ | Replace purchased Faxes per depreciation date<br>Replace purchased Faxes yearly on anniversary date of contract (avg. 6 months early)<br>Replace purchased Faxes not later than (fill out date) |
| | | ☐ | Do not transition existing 3d party / non-connected printers<br>Do not transition existing 3d party with bookvalue lower than (fill out amount) |
| | Savings | ☐<br>☐ | Report Gross savings per year over contract period (excl. management fee)<br>Report Nett savings per year over contract period (incl. management fee) |
| | | ☐ | Residual Value of machines replaced prior to depreciation needs to be subtracted from the savingsresult |

Fig.12

|  | Copier | MFP | Printer | Fax | Total |
|---|---|---|---|---|---|
| Units | 5 | 1 | 23 | 15 | 44 |
| Capital Exp | 11.263,03 | 100,00 | 47.191,91 | 3.374,25 | 61.929,19 |
| Consumables | 0,00 | 1.589,04 | 7.566,16 | 1.473,98 | 10.629,17 |
| Service | 0,00 | 0,00 | 1.452,00 | 1.188,00 | 2.640,00 |
| Colour Volume | 0 | 7.128 | 79.215 | 0 | 86.343 |
| Total Volume | 511.956 | 7.200 | 1.439.496 | 86.400 | 2.045.052 |
| Total | 11.263,03 | 1.689,04 | 56.210,07 | 6.036,23 | 75.198,37 |
| Average ppc | 0,0220 | 0,2346 | 0,0390 | 0,0699 | 0,0368 |
| % of Colour | 0,00% | 99,00% | 5,50% | 0,00% | 4,22% |

Fig. 13

|  | Current | | Year 2004 | | Year 2005 | | Year 2006 | | Year 2007 | | Year 2008 | | Year 2009 | |
|---|---|---|---|---|---|---|---|---|---|---|---|---|---|---|
|  | 3rd Party | Contractor | 3rd Party | Contractor | 3rd Party | Contractor | 3rd Party | Contractor | 3rd Party | Contractor | 3rd Party | Contractor | 3rd Party | Contractor |
| Copier | 5 | 0 | 5 | 0 | 0 | 0 | 0 | 0 | 0 | 0 | 0 | 0 | 0 | 0 |
| MFP | 1 | 0 | 1 | 7 | 1 | 7 | 0 | 7 | 0 | 7 | 0 | 7 | 0 | 7 |
| Printer | 23 | 0 | 8 | 3 | 4 | 4 | 1 | 4 | 1 | 4 | 1 | 4 | 1 | 4 |
| Fax | 15 | 0 | 15 | 0 | 0 | 0 | 0 | 0 | 0 | 0 | 0 | 0 | 0 | 0 |
| Total | 44 | 0 | 29 | 10 | 5 | 11 | 1 | 11 | 1 | 11 | 1 | 11 | 1 | 11 |

Fig.14

| | Current Price per page | Year 2004 Price per page | Year 2005 Price per page | Year 2006 Price per page | Year 2007 Price per page | Year 2008 Price per page | Year 2009 Price per page |
|---|---|---|---|---|---|---|---|
| Copier | 0,0220 | 0,0220 | 0,0000 | 0,0000 | 0,0000 | 0,0000 | 0,0000 |
| MFP | 0,2346 | 0,0126 | 0,0089 | 0,0075 | 0,0075 | 0,0075 | 0,0075 |
| Printer | 0,0390 | 0,0400 | 0,0474 | 0,0796 | 0,0796 | 0,0796 | 0,0796 |
| Fax | 0,0699 | 0,0699 | 0,0000 | 0,0000 | 0,0000 | 0,0000 | 0,0000 |
| Total volume | 2.045.052 | 1.533.789 | 2.045.052 | 2.045.052 | 2.045.052 | 2.045.052 | 511.263 |
| Price per page | 0,0368 | 0,0220 | 0,0150 | 0,0133 | 0,0133 | 0,0133 | 0,0133 |
| GROSS Savings % Comp. to current | | 22,61% | 59,16% | 63,77% | 63,77% | 63,77% | 3,99% |
| 5-Year average Savings % | 59,31% | | | | | | |

| | | | | | | | ACTUAL SURVEY DATES | | | | | | | COST BASE per year | | | | | | |
|---|---|---|---|---|---|---|---|---|---|---|---|---|---|---|---|---|---|---|---|---|
| Type | FTE | Country | BG | Type of site | Company | Site Name | SURVEY STATUS | SURVEY DATE | PROPOSAL STATUS | PROPOSAL PRESENTATION DATE | TRANSITION STATUS | TRANSITION DATE | Initial implementation date | # of KIT | Copiers | Printer | Fax | Total | Volume / % of color | absolute volume of color |
| 1 DECENTRAL | | | | | | | | | | | | | | | | | | | | 0 |
| | | | | | | Site | PLANNED | 01-Jan-03 | PLANNED | 21-Feb | PLANNED | 26-May-03 | | | | | €150 | €150 | | 0 |
| | | | | | | Site | PLANNED | 12-Jan-03 | PLANNED | 04-Mar | PLANNED | 6-Jun-03 | | | | | | €0 | | 0 |
| | | | | | | Site | PLANNED | 15-Jan-03 | PLANNED | 07-Mar | PLANNED | 9-Jun-03 | | | | | | €0 | | 0 |
| | | | | | | Site | PLANNED | 03-Feb-03 | PLANNED | 26-Mar | PLANNED | 28-Jun-03 | | | | | | €0 | | 0 |
| | | | | | | Site | PLANNED | 06-Feb-03 | PLANNED | 29-Mar | PLANNED | 1-Jul-03 | | | | | | €0 | | 0 |
| | | | | | | Site | PLANNED | 12-Feb-03 | PLANNED | 04-Apr | PLANNED | 7-Jul-03 | | | | | | €0 | | 0 |
| | | | | | | Site | PLANNED | 12-Feb-03 | PLANNED | 04-Apr | PLANNED | 7-Jul-03 | | | | | | €0 | | 0 |
| | | | | | | Site | PLANNED | 06-Mar-03 | PLANNED | 26-Apr | PLANNED | 28-Jul-03 | | | | | | €0 | | 0 |
| | | | | | | Site | PLANNED | 12-Mar-03 | PLANNED | 02-May | PLANNED | 4-Aug-03 | | | | | | €0 | | 0 |
| | | | | | | Site | PLANNED | 13-Mar-03 | PLANNED | 03-May | PLANNED | 5-Aug-03 | | | | | | €0 | | 0 |
| | | | | | | Site | PLANNED | 14-Mar-03 | PLANNED | 04-May | PLANNED | 6-Aug-03 | | | | | | €0 | | 0 |
| | | | | | | Site | PLANNED | 15-Mar-03 | PLANNED | 05-May | PLANNED | 7-Aug-03 | | | | | | €0 | | 0 |
| | | | | | | Site | PLANNED | 15-Mar-03 | PLANNED | 05-May | PLANNED | 7-Aug-03 | | | | | | €0 | | 0 |
| | | | | | | Site | PLANNED | 29-Mar-03 | PLANNED | 19-May | PLANNED | 21-Aug-03 | | | | | | €0 | | 0 |
| | | | | | | Site | PLANNED | 14-Apr-03 | PLANNED | 04-Jun | PLANNED | 6-Sep-03 | | | | | | €0 | | 0 |
| | | | | | | Site | PLANNED | 02-May-03 | PLANNED | 22-Jun | PLANNED | 24-Sep-03 | | | | | | €0 | | 0 |

Account
Latest update
Management Fee 5%
Exchange rate GBP 1.5947
Owner Project Manager survey to proposal in weekdays 51
presentation to transition 94

Fig. 30A

| Total cost | GROSS Saving % year 1 of the contract | GROSS Saving absolute year 1 of the contract | # months in 2003 in which saving is applicable | Current cost in 2003 | New cost in 2003 excl management fee | New cost 2003 incl. management fee | Net saving 2003 including management fee | Net saving % 2003 including management fee | GROSS Saving % ave 5 year | GROSS Saving absolute 5 years | 5 year spend CURRENT COST | 5 year spend excl. management fee | 5 year spend incl management fee | NET saving 5 year TOTAL | NET Saving 5 year % |
|---|---|---|---|---|---|---|---|---|---|---|---|---|---|---|---|
| € 100 | 33.3% | € 50 | 6 | € 75 | € 50 | € 53 | € 23 | 30% | 40.2% | € 301 | € 750 | € 449 | € 471 | € 279 | 37% |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |
| | #DIV/0! | € 0 | | € 0 | € 0 | € 0 | € 0 | #DIV/0! | | € 0 | € 0 | € 0 | € 0 | € 0 | #DIV/0! |

Fig.30B

SITE MANAGEMENT
Data Interpretation

☐ Customer Name

☐ Volume
  - ☐ volumes on machines (actual versus original)
  - ☐ b/w versus color ratio
  - ☐ Color volume
  - ☐ non-connected machines
  - ☐ volumes on device level
  - ☐ use of device (prints/scans/copies)

☐ Costs
  - ☐ Total cost
  - ☐ b/w
  - ☐ Color
  - ☐ Non connected
  - ☐ Supplies
  - ☐ Other ☐ Service KPI's
  - ☐ Total average uptime
  - ☐ Average response time
  - ☐ Average repair time
  - ☐ Machine level

Fig.31

SITE MANAGEMENT
Data Analysis

- [ ] Customer Name [_____]

- [ ] Volume
  - [ ] volumes on machines (actual versus original)
  - [ ] b/w versus color ratio
  - [ ] Color volume
  - [ ] non-connected machines
  - [ ] volumes on device level
  - [ ] use of device (prints/scans/copies)
  - [ ] User
  - [ ] Application

- [ ] Costs
  - [ ] Total cost
  - [ ] b/w
  - [ ] Color
  - [ ] Non connected
  - [ ] Supplies
  - [ ] Other
  - [ ] Fleet flexibility

- [ ] Service KPI's
  - [ ] Total average uptime
  - [ ] Average response time
  - [ ] Average repair time
  - [ ] Machine level
  - [ ] Repair level

- [ ] Specifics
  - [ ] Extrapolate next quarters
  - [ ] Potential year performance (management fee)
  - [ ] Potential gain share
  - [ ] Look for trends (b/w vs color, volume, device level)
  - [ ] Supplies vs. volumes of non connected machines
  - [ ] Actual cost vs. solution
  - [ ] Average volume within bandwidth
  - [ ] fading in / fading out new machines
  - [ ] customer / site movements

Fig.32

AGENDA CENTRAL TEAM - QUARTER AND YEAR REVIEWS

☐     Customer Name

Subjects Quarter and Year reviews     Additional subjects Year review

Performance quantitative
- ☐ Current savings against target
- ☐ Average uptime
- ☐ Average response time
- ☐ Number of NRG placements
- ☐ Number of 3d party placements
- ☐ Number of 3d party removals
- ☐ Volume b/w
- ☐ Volume color
- ☐ Extrapolated performance current year (after Q2)

- ☐ Management fee's earned locally
- ☐ Additional gain share fee
- ☐ Penalties paid
- ☐ New Year targets agreed locally
- ☐ Average overall target

Performance qualitative
- ☐ Aggregated scores of customer surveys
- ☐ Actions

- ☐ Overall customer satisfaction
- ☐ Exceptions on country or site level

Miscellaneous
- ☐ PLC Issues
- ☐ Local issues
- ☐ Third party issues
- ☐ Logistics

Fig.33

SITE MANAGEMENT
Ordering Form - including the impact of options

| | Description | | | | Order Type | | | | Cost base | Target |
|---|---|---|---|---|---|---|---|---|---|---|
| | Machine (incl. options) | Volume (B/W) | Volume (Color) | Location | New request | Downgrade | Like for like | Upgrade | Cost base effect | Adjusted target |
| Option 1 | | | | | | | | | | |
| Option 2 | | | | | | | | | | |
| Option 3 | | | | | | | | | | |
| Other | | | | | | | | | | |

Signed on _____  Date _____

Customer

Signature _____

Name _____   NRG

Site Champion   Signature _____

Name _____

Contract Manager

Fig. 34

METHOD AND APPARATUS FOR MANAGING PRINTING DEVICES

FIELD OF THE INVENTION

This invention relates to apparatus and a method for the management of printing devices, such as printers, multi-functional products, print servers, faxes, copiers, infrastructure devices including print server appliances and print drivers, distributed over all the sites of a client undertaking. Management can include monitoring the cost efficiency and performance of the devices and the associated software and services (such as delivery, maintenance and repair), and recommending then implementing changes to optimise the fleet of printing devices. The invention also relates to the business process of preparing for and implementing a contract for managing printing devices.

DESCRIPTION OF THE PRIOR ART

Many large companies have a confusing mix of different printing devices. This makes technical support for all the different makes and models of equipment complex to administer and effect, and therefore this is costly and takes large amounts of time or requires large numbers of employees.

Equally many small companies have similar problems, due partly to constraints on their budget which oblige them to replace or acquire additional equipment which is a different brand or model. Equally these budget constraints can lead to lengthy service times due to understaffing.

Technological developments in reprographic and printing equipment and the growth in multi-functional equipment will only add to this service burden.

Predicting costs for printing devices can be a complex task with the mix of equipment referred to above. There are often hidden costs including supplies such as ink, toner and paper, spare parts costs, costs associated with user training and user familiarisation, and service charges. In addition there is the hidden cost of time wasted when a piece of equipment has jobs queued up, when a piece of equipment is awaiting maintenance or when it is awaiting restocking of supplies.

Equally the location of the equipment can be poorly thought out, with one machine being used continuously by a large pool of employees whilst other employees have the luxury of machines with vast surplus of capacity.

Some manufacturers of printing devices provide network-enabled tools to monitor the status of each device including whether it is working and what its toner level and paper supply status is. This can help reduce service and restocking times if there are sufficient personnel.

The Hewlett Packard Web Jet Admin software provides such information as a management tool. Further, their publication US 2003/0172086A discloses software for optimising printing devices by determining their usage characteristics, their available options (such as paper handlers, services, operations and updated drivers) and their existing installed options, and then optimising the configuration of at least one device as a result. The optimising process may take account of two or more networked devices to suggest changes to one of them.

SUMMARY OF THE INVENTION

It is an object of the invention to facilitate management of printing devices by enabling the managers to have ready access to a visual display of the performance of the fleet of printing devices, compared with predetermined targets for key performance indicators.

This object can be attained by a process of management of printing devices at distributed sites, comprising providing a database portal accessible continuously, the portal giving a visual display of performance of the printing devices compared with predetermined targets for key performance indicators.

A further object of the invention is to enhance the sales of printing devices and associated services by promising greater efficiency as a result of a management service provided by a contractor, preferably including demonstrable cost savings over a contract period.

To achieve this object, the invention provides a process of preparing for and implementing management of printing devices located at distributed sites carried out by a contractor for a client, comprising:
  the step of the contractor negotiating with the client key performance indicators applicable for the duration of a management service contract and including targets for the key performance indicators, and rewards and penalties for performance of the printing devices against those targets,
  and the step of the contractor periodically monitoring the key performance indicators to provide the client with an indication of performance against the targets.

The invention can provide client benefits such as transparency of costs, which can be made clearly visible as to what has been spent and what is anticipated to be spent in future, with no hidden costs for supplies, services or anything else. The management process can be used to make costs savings through more effective use of the client's assets and its financial arrangements such as leases on printing devices. Cost savings can be made by having a single contractor to provide overall management of the fleet of printing devices, reducing operational management effort from the client's own staff, and even allowing the client to reduce staff numbers, leading to indirect cost savings.

Effective management service of the fleet can lead to greater uniformity in the machines, resulting in more effective use, and less training time for users, together with improved user satisfaction and greater functionality per machine with, for example, higher speeds, better quality of document output and easier access to colour devices.

The benefits to the contractor which may be a manufacturer or other supplier of printing devices, is that it gives the contractor greater control over, for example, the total document volume production of the client. Subject to the need to demonstrate effective and cost efficient management, the contractor is enabled to sell greater volumes of its own products, in competition with third party products which it may procure as a principal contractor to the client. Revenue may be obtained through the procurement of third party products such as consumables and spares. The closer relationship with the client also enables the contractor to find cross-selling opportunities for its own services and document solutions.

It will be appreciated that the contractor may be incentivised to deliver cost savings to the client, in return for a variable management fee. Such is the potential for savings through greater efficiency in a large number of enterprises that significant benefits may be obtained, through the use of this invention, by both contractors and clients.

The preferred embodiment of the invention has the steps of surveying the client's site; translating this into a proposal for a management contract, taking account of future phasing in and out of equipment from different manufacturers; and carrying out the management of the fleet, using dedicated local managers, providing regular reporting, and continuously taking account of customer behaviour i.e. the way the equipment is being used.

The object can also be attained by the invention consisting in a process of management of printing devices at geographically distributed sites within a client organisation, carried out exclusively by a contractor under a management contract, comprising allocating a contract manager in the contractor organisation and dedicating that contract manager to the task of managing all the client's printing devices over a plurality of the distributed sites, whereby the contract manager regularly monitors the status and usage of the printing devices and associated software and services and consumables supplies, regularly seeks to optimise their overall performance against predetermined key performance indicators including cost, implements changes over the period of the management contract to optimise performance, and regularly provides reports to the client organisation.

A further object of the invention is to allow a contractor, which may be a manufacturer of printing devices, to improve its revenue from its own sales of hardware or software and associated services, by providing a complete management service, to at least one client enterprise, by which it manages a fleet of printing devices at the distributed sites of each client.

This object is achieved by the invention which consists in a process of management of printing devices at distributed sites, comprising providing a database portal accessible continuously, the portal giving a visual display of performance of the printing devices compared with predetermined targets for key performance indicators.

A particular benefit of this invention is that the same structure for the management service is used no matter what the size of the client enterprise may be. The same structure is used whether the client has just one site for its printing devices or multiple sites in one country, or multiple sites in multiple countries globally. It is envisaged that the contractor will have staff operating in each country or region where the client has its operations. Contractor staff with central or global responsibility for that client will assume that specific role, and will cooperate with other staff, probably in other locations, who have responsibility for respective local regions. In the event that the client requires management only in one country for example, then the global and local management services may be unified, within the same management service structure, in accordance with the invention. To this end, the local and global management services may be provided by managers, within the contractor company, who may have only local responsibility for another client but have global responsibility for this particular client.

This invention allows great efficiencies to be made by standardising operating procedures and documentation within the management service structure. There is no need for the structure to be changed to suit different sizes of client enterprises.

DESCRIPTION OF THE DRAWINGS

In order that the invention may be better understood, a preferred embodiment of the invention will now be described, by way of example only, with reference to the accompanying schematic drawings, in which

FIG. 12 is a template document for recording the client's cost base and preparing a proposal for change;

FIG. 13 is a table of cost base data generated by Caspar or COMPASS software;

FIG. 14 is a table of planned changes to the numbers of printing devices, generated by COMPASS software;

FIG. 15 is a table showing cost savings for the changes shown in FIG. 14, generated by COMPASS software;

FIGS. 20, 21 and 23 to 29 are screen prints from Microsoft Internet Explorer representing a web portal display provided by the managed print system embodying the present invention, in which:

FIG. 20 represents a menu of clients, called "customers" in this example, of a particular contractor running the managed print system;

FIG. 21 shows a menu of country regions for one specific selected client from the menu of FIG. 20;

FIG. 23 shows, in a "dashboard" visual display, a representation of performance against target for several key performance indicators;

FIG. 24 shows invoice items for a specific site within one country region of the specific client;

FIG. 25 shows data for new machines delivered and active within the managed print service in a country region of the same client;

FIG. 26 shows financial contractual information relating to the specific client and more particularly to one site within one country region of that client;

FIG. 27 shows meter reading at a machine level;

FIG. 28 shows a financial overview at site level; and

FIG. 29a to 29c show an action list in three parts;

FIG. 30A is the left hand side of a spreadsheet for recording data relating to a prospective customer's site during a site survey; and FIG. 30B is the right hand side of the spreadsheet of FIG. 30A, showing a proposal for use in an offer of a contract for managed print services, indicating promised cost savings for a client;

FIG. 31 is a template document for use internally by the contractor to prepare meaningful information to a manager to facilitate data interpretation during site management;

FIG. 32 is a further template document for use internally by the contractor to prepare meaningful information to facilitate data analysis during site management;

FIG. 33 is a template document for an agenda for a regular management meeting during site management; and FIG. 34 is a template document for an ordering form for a change to the fleet, including an indication of the impact of each of several options.

DETAILED DESCRIPTION OF THE PREFERRED EMBODIMENT

Figure 1:
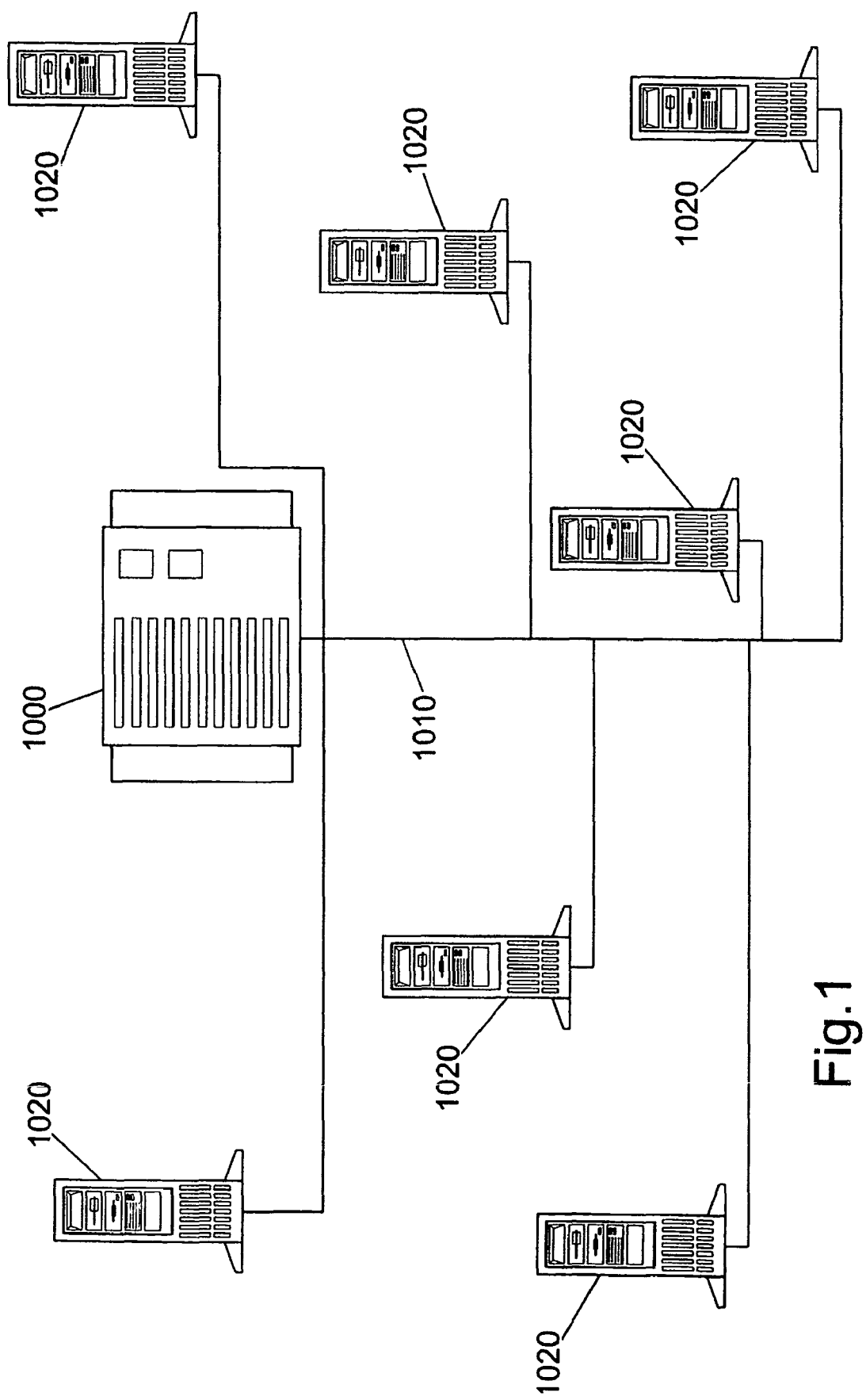
FIG. 1 represents a network of data processors on which the managed print software embodying the invention operates.

The preferred embodiment of the invention is a method of doing business supported by software tools for the management of print services carried out in various different sites of each client. This method, the software tools and the hardware which runs them will be described below, as will the negotiation and implementation of a service contract for the management of printing devices together with all the associated hardware, software and services.

In this specification, printing devices are intended to include reprographic hardware such as photocopiers and faxes, as well as printers, multi-functional printers, print servers, infrastructure devices such as print server appliances, and print drivers. Associated with these printing devices are other peripheral items of equipment, and consumable items such as ink cartridges and machine spare parts. Associated services include removals and delivery services, maintenance and repair services and IT development services. The embodiment of the invention described below enables the contractor to take responsibility for the provision of all such hardware, software and services, either directly or through the procurement of third party supplies and services.

The client also has the role of negotiating the management contract with the contractor, monitoring its progress including using information provided by the software of the management system; and usually also in providing IT services and accommodation for the printing devices in the client's own sites. However, even the provision of IT services including networking management can be included in the contract for management of the print services.

As described below, the managed print system is fully structured, with standardised procedures and documentation, so that it is scaleable and it may be used by any contractor. It could be operated by IT service providers or other types of organisation with knowledge of reprographics. It is envisaged that the main contractors using such a system will be manufacturers and suppliers of printing devices, so that they will be able to enhance sales of their own products, and extend the provision of their services. It is further envisaged that the main clients will be large corporations with distributed sites, although the system is equally applicable to smaller enterprises who may even have only one office. This preferred embodiment of the invention is arranged to provide an ordered transition from an existing arrangement, surveyed in a site survey, through to a new arrangement in which printing devices and associated hardware, software and services, have been optimised. Following this transition of one or several sites to the optimised arrangement, full site management commences, with regular reviews of the print services to establish whether further optimisation is required, until expiry of the contract period.

As will be described below in greater detail, the same structured managed print system is applicable no matter what size of client enterprise: the system identifies activities to be formed at the global level and other activities to be performed at the local level, within the contractor's organisation, in order to manage the printing devices of the client which are distributed over sites, local regions (which may be countries) and globally; however, these local and global activities may be unified in the event that the client has only one local region, for example if it requires print service management in only one country.

It is a further important feature of this embodiment that the management service is made most attractive to prospective clients, in that it promises and monitors the delivery of specific cost savings over the contract period. It provides cost transparency and control to the clients, and allows clients to manage costs. Further, it provides readily accessible and easily understandable graphic information both to the contractor's staff at all levels and also to authorised staff within the client organisation, including key perfomance indicators and critical financial information.

The contractor, in this example, will take over the customer's existing reprographic activities (including contractor's and 3rd party devices) on a global level and manage all copy, print, scan and fax activities; against predetermined and agreed conditions, guaranteeing cost savings over the contract period.

It is a solution driven transformation of the client's existing reprographic base to a management environment consisting of four major steps. After the preparation phase the contractor starts the survey phase followed by the actual transition phase. The final step is management of the different predefined sites. This last step is an ongoing activity.

Rollout Preparation (0)

In the preparation step the contractor identifies the scope of the project, the portfolio needs, pricing, set-up the cost-base and proposal rules and agrees with the client the deployment policies. Together with the agreed service levels it transforms this into a Frame Agreement, signed by both parties. In this phase it also identifies the different central and local project teams.

Site Survey (1)

Identifying the current installed base, and analyze the current cost base and make a proposal at site level supported by floor plans. The contractor will identify both contractor's and third party products as well as the requirements for copying, scanning, printing and faxing. After agreeing the cost base it will make a proposal on site-level. The basis for the proposal will be a combination of existing reprographic environment (=current situation), customer requirements, agreed proposal rules and deployment policies. Proposals will show the most costs effective phase-in of contractor's manufactured products and legacy (third party products) phase-out plan for the duration of the contract.

Site Transition (2)

The second step involves migrating the existing base to the new environment. All machines will be network connected and are installed to the advanced web-based management portal, enabling automatic collecting of the meter readings.

Site Management (3)

This phase, which will last over the life of the contract, is led by a contract manager. The web portal offers an environment where the contract manager manages the fleet on both local as well as central level. The contract manager analyses machine usage, organizational changes and user behaviour and reports all findings to the customer on a monthly basis. Together with the customer site champions the contractor ensures that the fleet is running to the lowest possible costs.

The portal also provides intelligent reporting functionalities and helpful tools to support the day-to-day monitoring of the fleet.

Some key functionalities of the portal
    Overview of the installed reprographic base
    Performance on Service Level Agreements (SLAs) (call to response/call to fix/uptime)
    Actual usage specified per unit
    Volume breakdown information for copy/print/B&W/Colour/Scan, etc.
    Actual usage vs. target usage
    Actual costs versus expected and agreed costs (based on implemented situation)
    Monitoring console showing status and fault messages on fleet (in the updated release)

All activities in this phase are aimed to create more transparency of the reprographic environment and will support the site in maintaining and optimising the actual savings. The contract manager will communicate to both individual site champions as well as the central team. Each country will have its own contract manager. The contract management role is mainly aimed on five core activities:

Monitor and steer on agreed service levels
    Manage savings on site level and show variances
    Reporting on site and country level
    Communicate to site champions and central team
    Managing processes and customer expectations (the contract manager being the "spider in the web")

Figure 4:
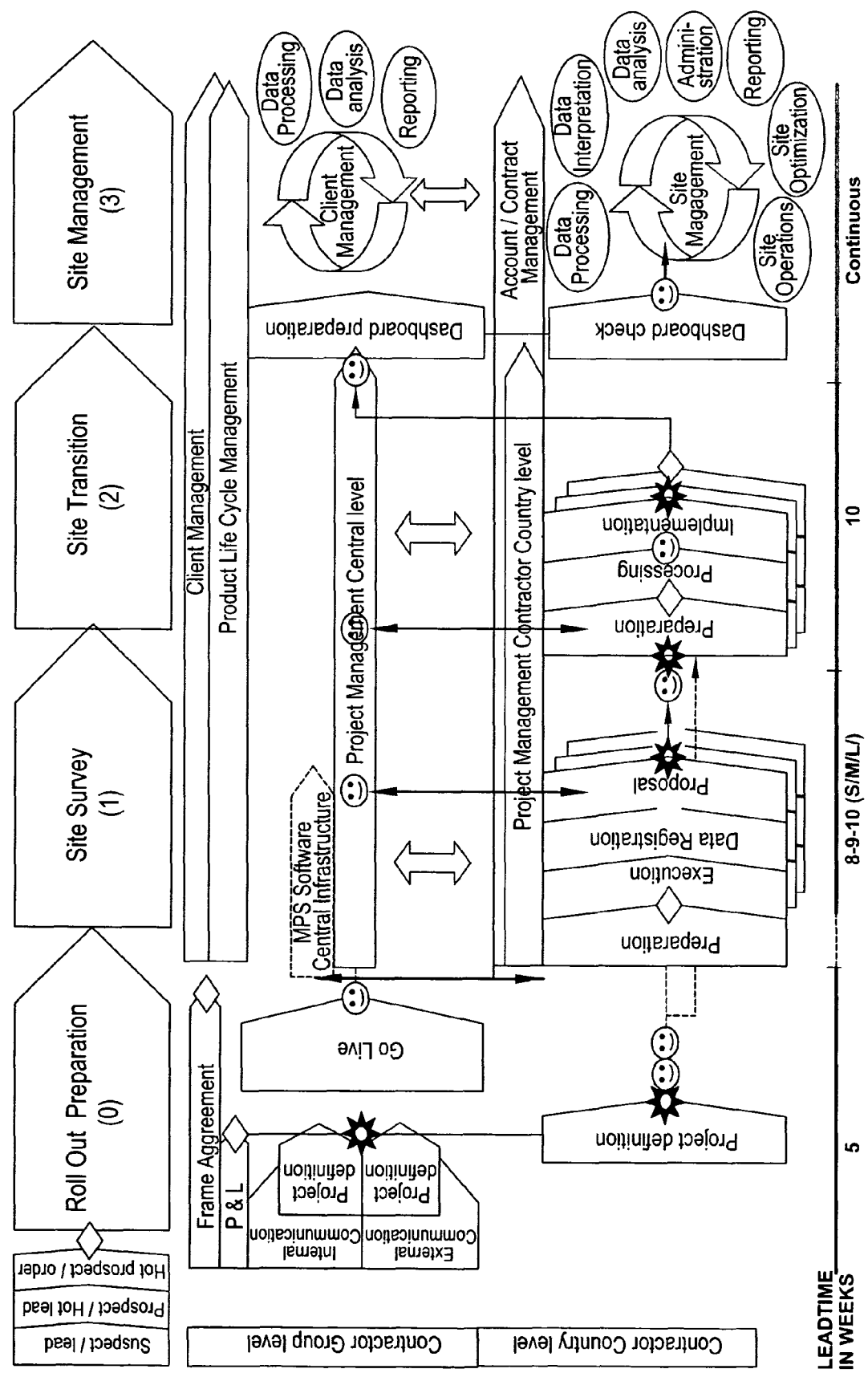
FIG. 4 is a diagram giving an overview of the system including its phases of implementation.

The stages (0) to (3) are shown in the workflow diagram of FIG. 4. In this and similar diagrams, the star symbol represents a meeting; the smiley face symbol represents approval having been given; and the solid diamond represents a signed off document. The duration of the site survey, 8-9-10 weeks, depends on the size of the client being respectively Small, Medium or Large.

Figure 5:
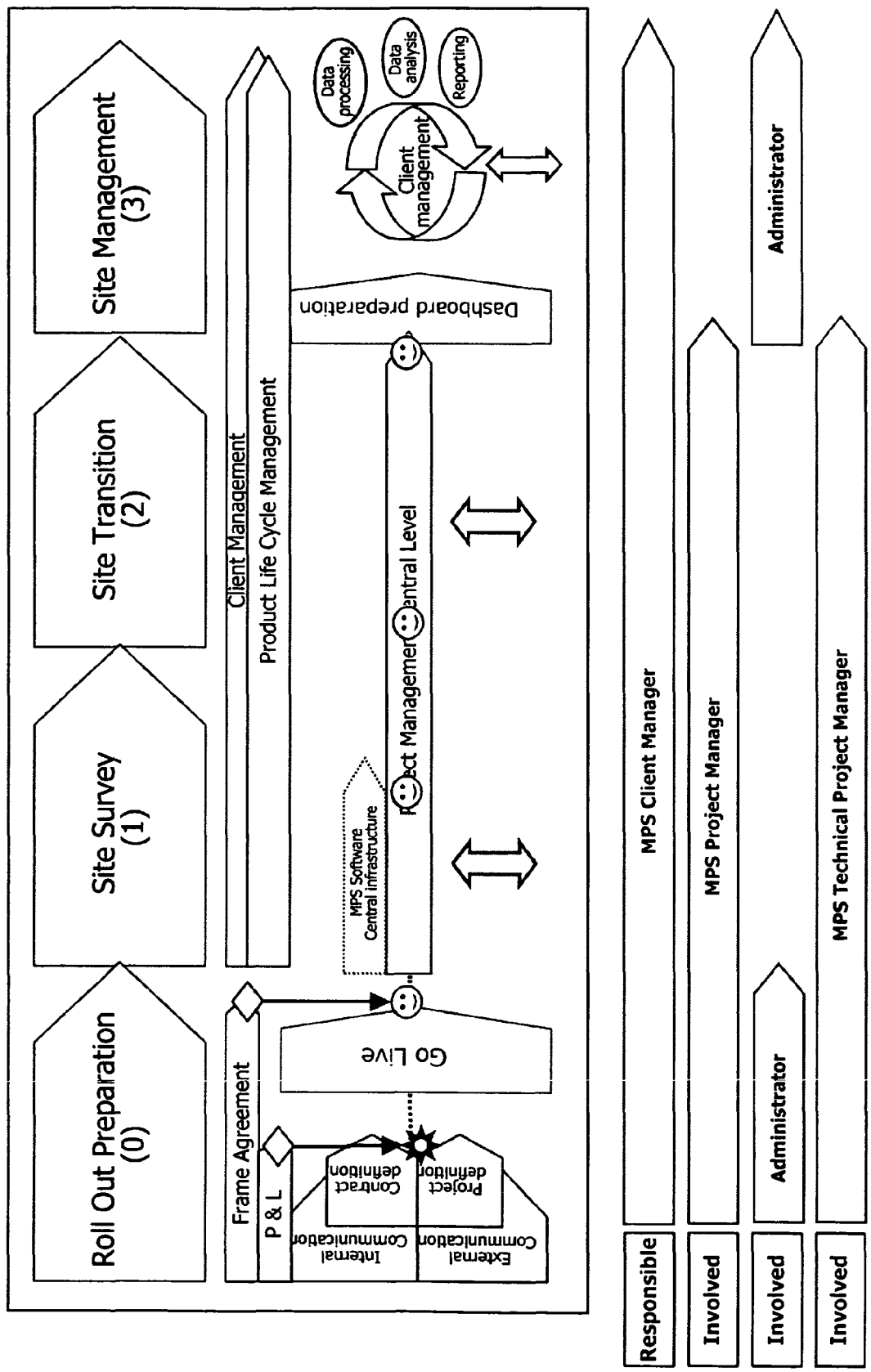
FIG. 5 corresponds to FIG. 4 and shows responsibilities at central/global level.
Figure 6:
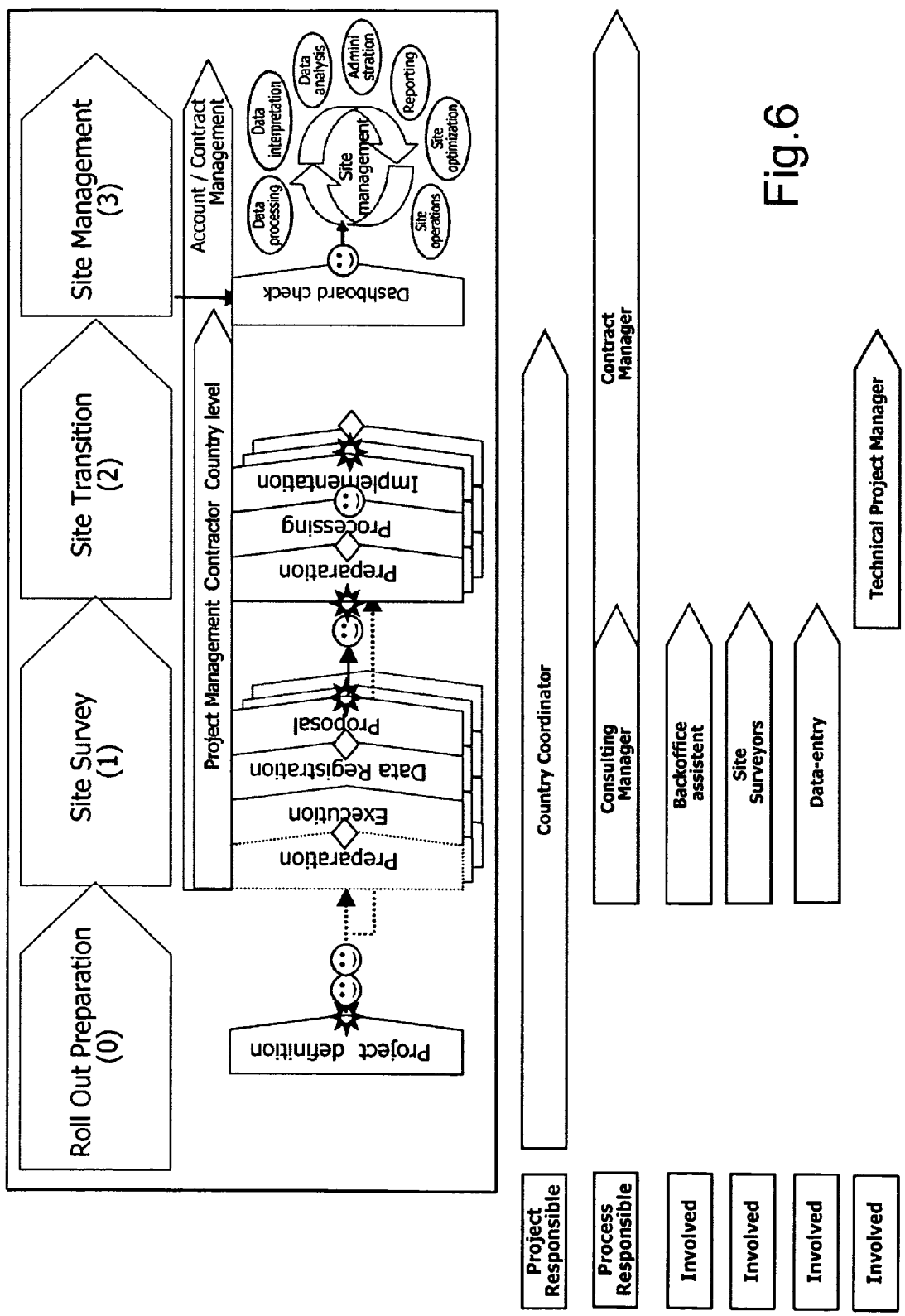
FIG. 6 corresponds to FIG. 4 and shows responsibilities at local level.

Human resources responsibilities at global/central level and at local level are shown respectively in FIGS. 5 and 6, relative to the tasks shown in FIG. 4. The contractor's Client Manager has end responsibility for the total implementation process, supported by the client (customer) specific Project Manager, who steers all roll-out preparation, site survey and site implementation activities, and who interfaces with local country coordinators. The contractor's technical project manager coordinates all the IT-related activities, and the roll-out of software that will be required for site management: Octopus, etc.

At local level, the country coordinator steers all activities such as the site survey, site proposals and actual implementation.

Figure 7:
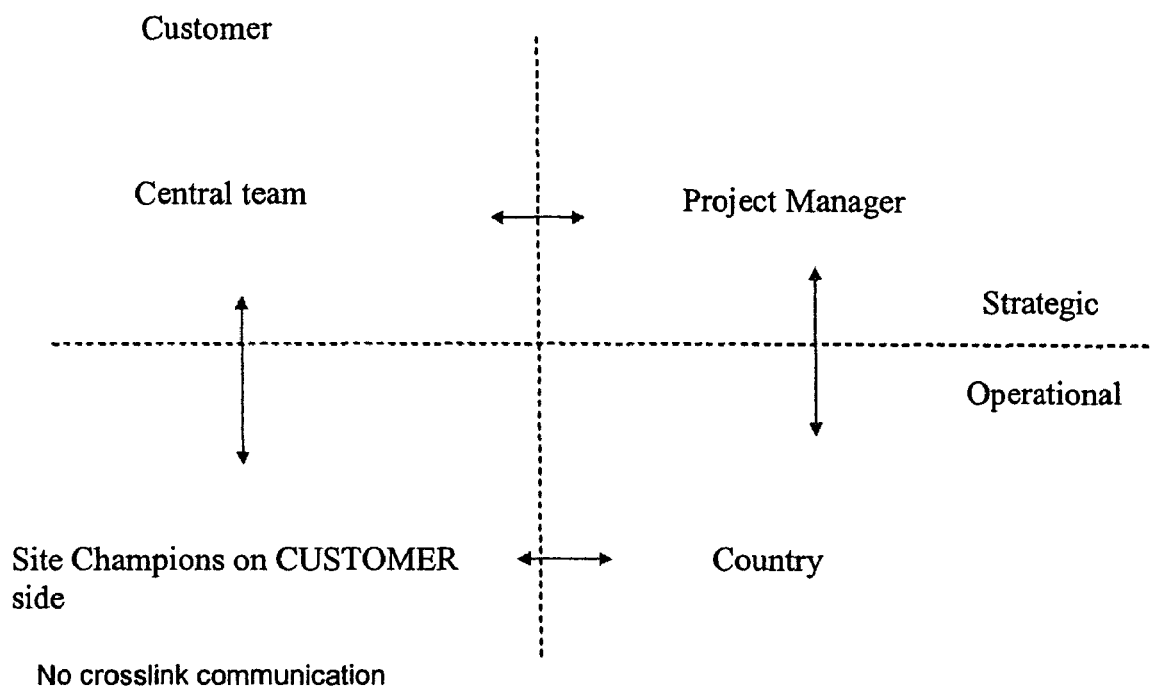
FIG. 7 is a diagram of local/global responsibilities.

The responsibility structure is shown and project management schematically in FIG. 7.

Figure 8:
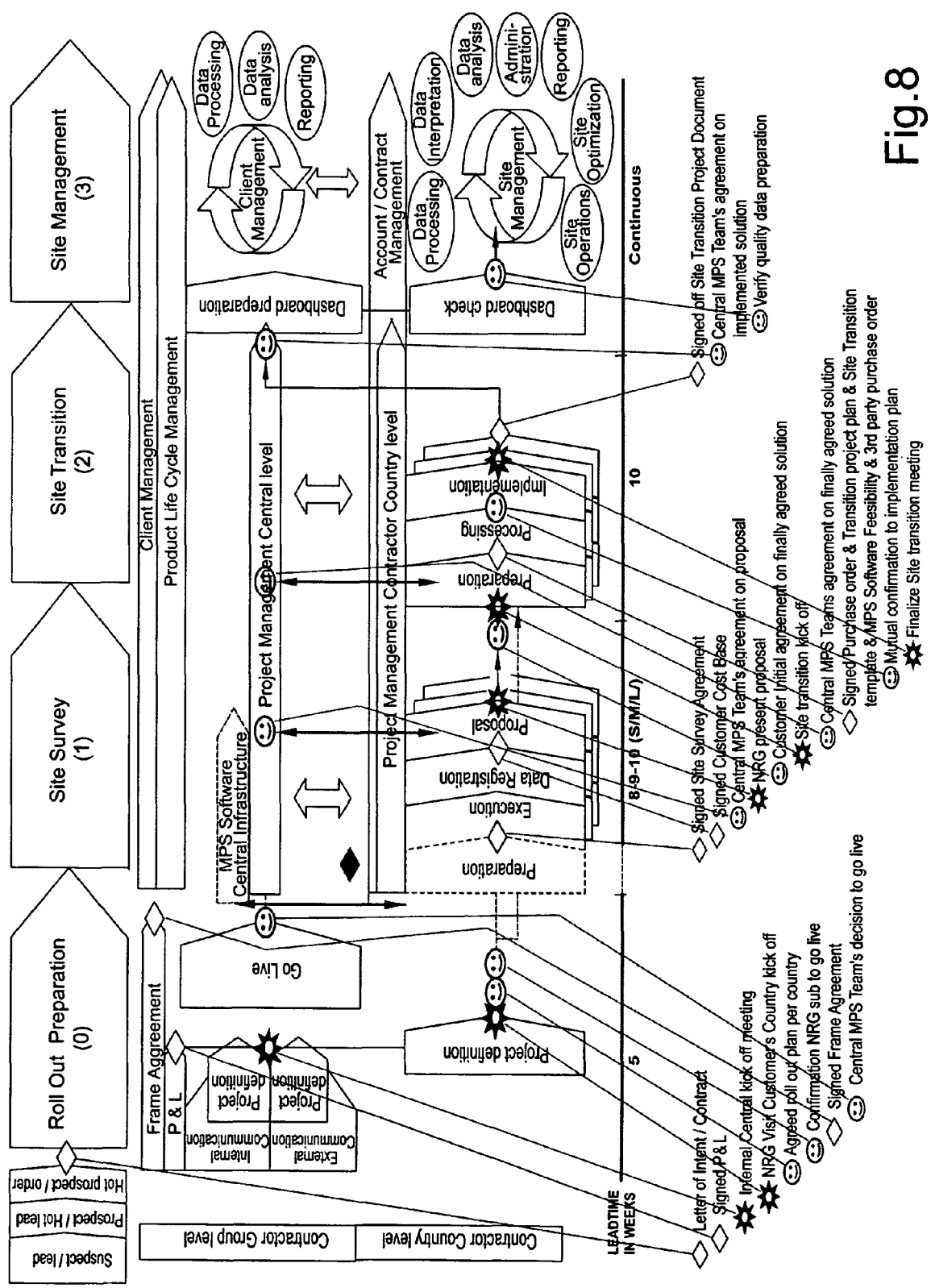
FIG. 8 is a project management chart corresponding to FIGS. 4 to 6.

FIG. 8 shows the technical side and project management of the processes. Numerous check-lists are generated and are shared between contractor and client, at both global/central and local level, via an Internet-based shared information and project board. This includes:

Survey documents
    Site proposals
    Rollout status
    Portfolio details
    Action item registers amongst other items.

Figure 9:
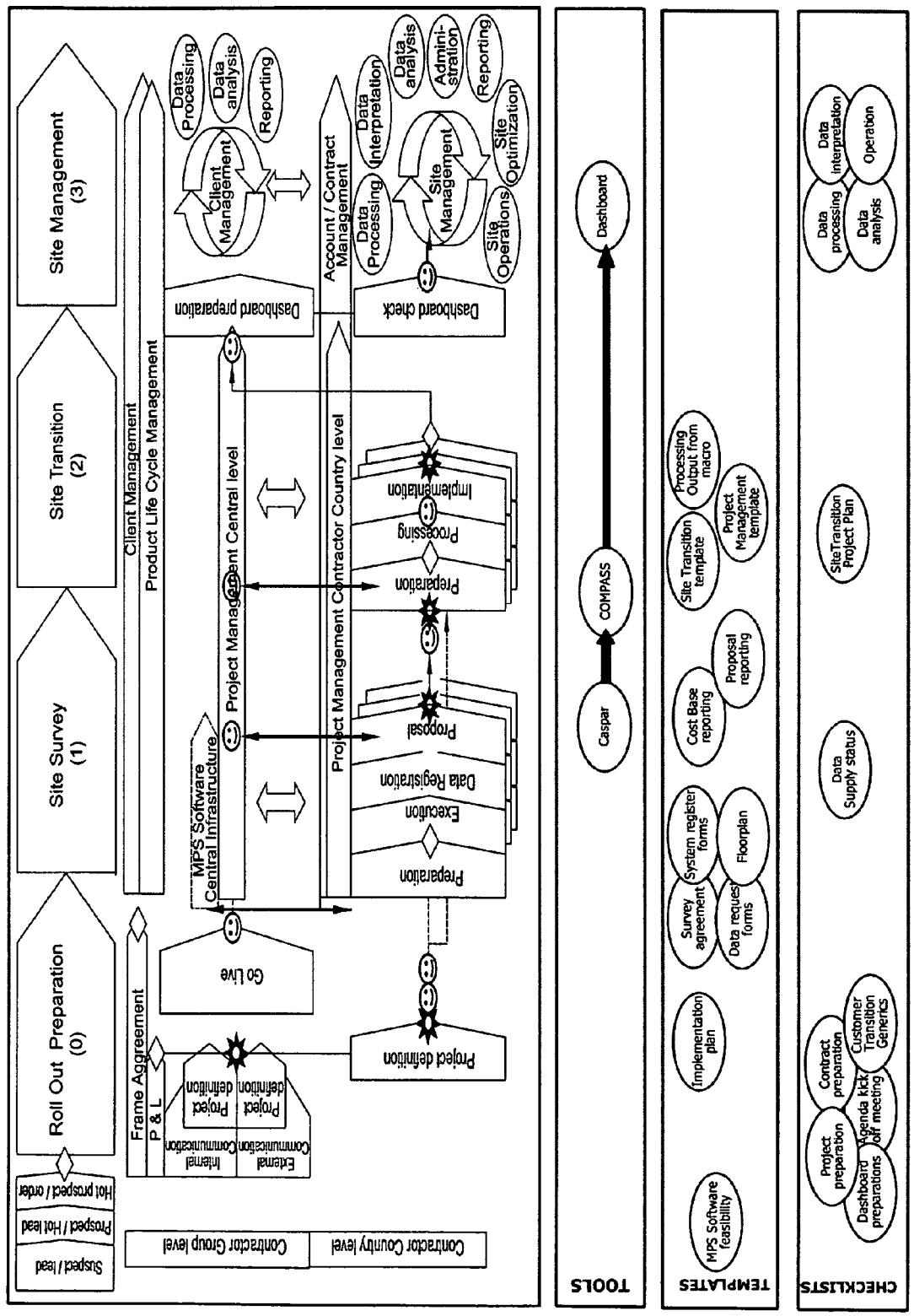
FIG. 9 shows the use of tools, templates and checklists in the system, and corresponds to FIG. 8.
Figure 10:
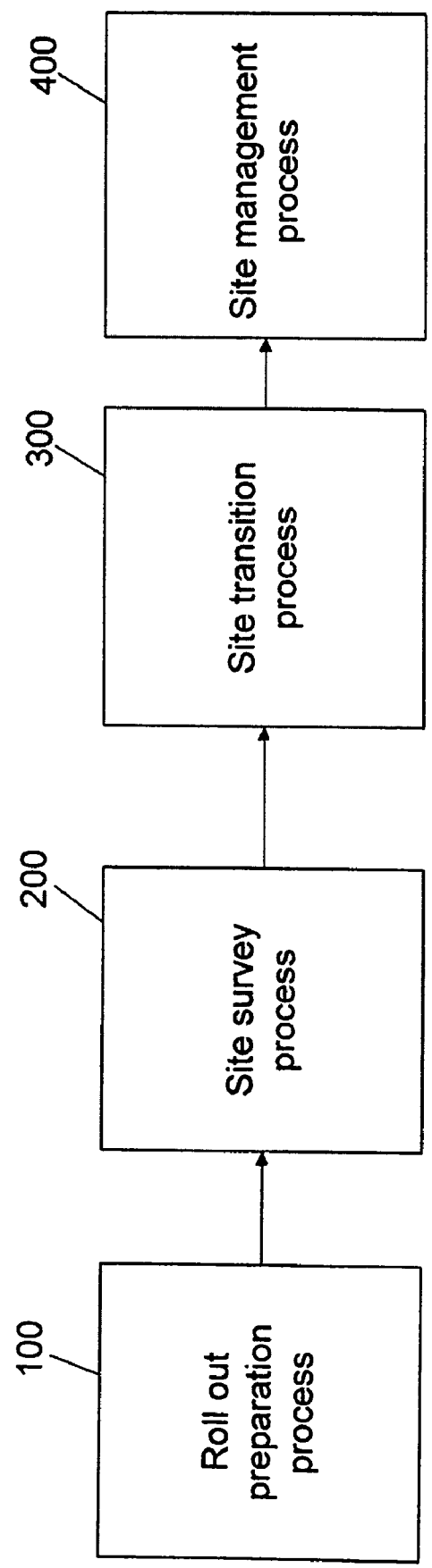
FIG. 10 is a flow diagram of the main processes in the managed print business system of the preferred embodiment of the invention.

FIG. 9 provides and example of tools, templates and check-lists defined for each step in the system.

FIG. 1 shows schematically a typical wide area network within a contractor's organisation. A central server 1000 is linked over the wide area communications network 1010 to several local site servers 1020 which are located in different offices or other buildings in a country region or spread across several country regions. The local site servers 1020 may be owned by the contractor, or may be the property of one or more clients of the contractor. The network 1010 may consist only of a public network such as the Internet.

Figure 2:
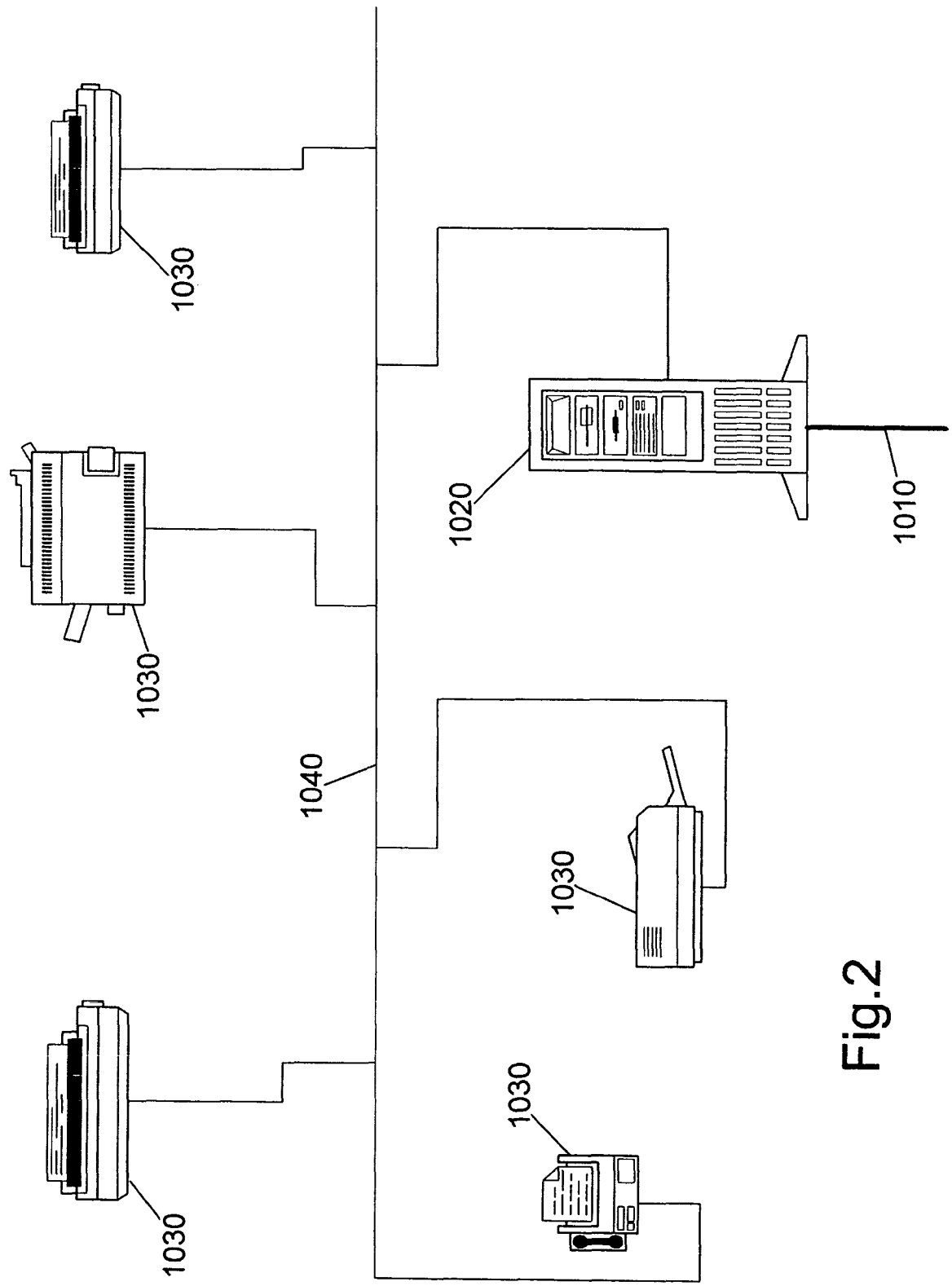
FIG. 2 represents a local area network internal to a client's site.

As shown in FIG. 2, a typical client site has one local site server 1020 on the managed print network 1010, which provides access for the contractor. The client's internal network 1040 links various different printing devices 1030 such as copiers, networked printers and fax machines. The local site server 1020 has the various print drivers and other appropriate software for the local site, and some of the printing devices 1030 will have their own software functionality which may include for example information as to its existing configuration and alternative possible configurations, as well as computer memory, and so on. Larger sites may of course have more than one local site server 1020, and those local site servers may themselves be networked or be connected directly to the wide area communications network 1010 for communication with the contractor's server 1000.

The managed print software comprises a suite of programs, some of which are resident on the central server 1000, and others of which are resident on the local site servers 1020.

One client/server application, known as OCTOPUS in this example, is built on the SQL Server software of Microsoft, is resident partly on the central server 1000, and is operable for one or more than one client organisation.

Figure 3:
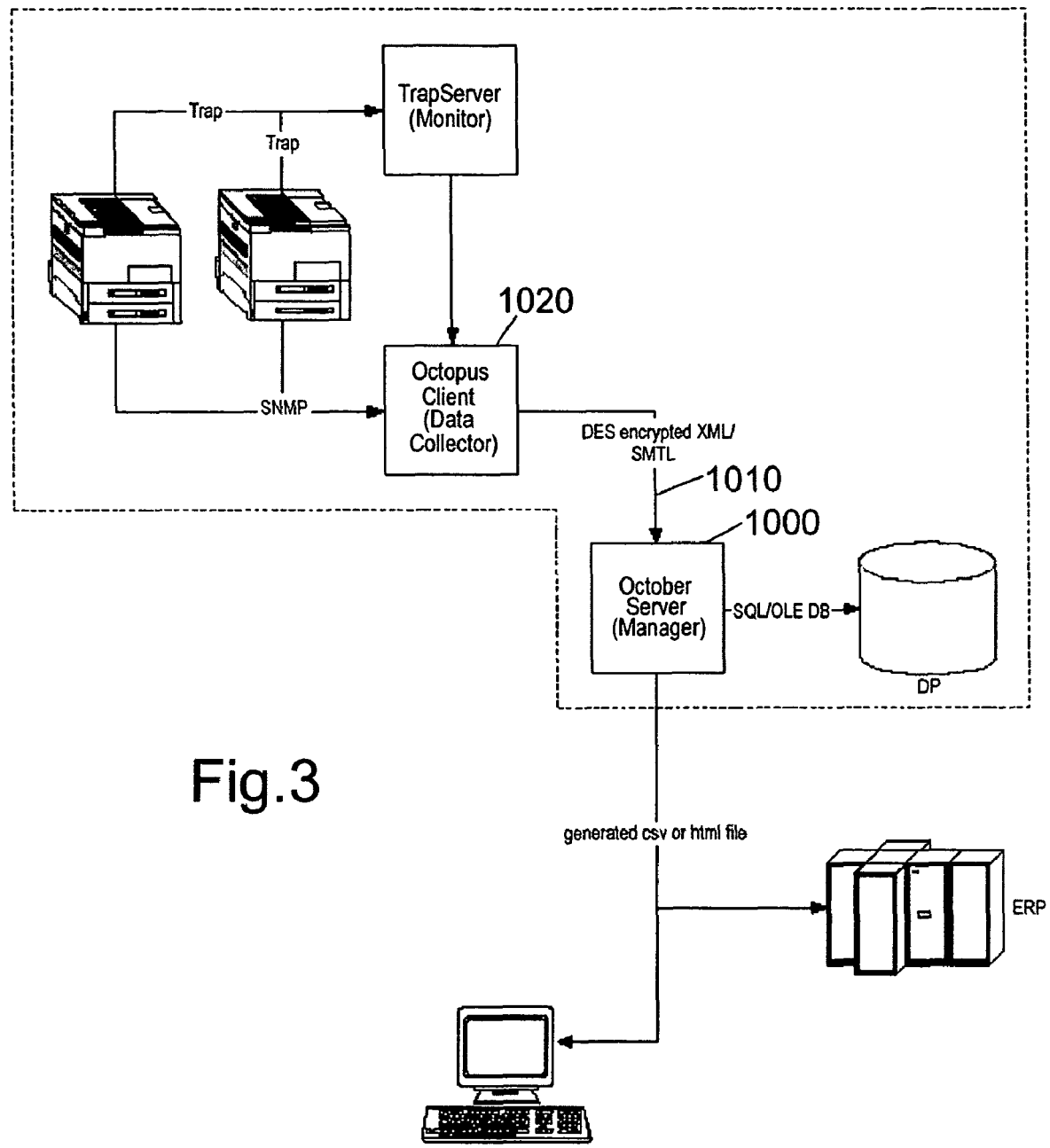
FIG. 3 is a diagram showing the Octopus system and its associated hardware, for collecting technical data on an ongoing basis.

As shown in FIG. 3, the OCTOPUS client/server application has an architecture in which the Octopus Client is located on the client's server PC 1020 on the client's network, to monitor the fleet. The OCTOPUS Server is located remotely, and could coincide with the central server 1000 of FIG. 1. It may receive data from several clients. In this example, the Client and Server both have email accounts and communicate by email.

The server generates reports which are used by subsequent processes, such as an ERP system for generating invoices for the managed print system. The reports may be uploaded to the web portal for fleet management, and they may be analysed manually for detailed fleet diagnostics.

The Octopus Client extracts data continuously from the printing devices in two ways: first, by requesting (e.g. daily) each device's MIB (Management Information Block), with details of print and scan counters in the firmware, and up-time performance; and second, by receiving alerts via the client network giving the status of consumables, paper jams, hardware status such as door open, and service codes.

The Octopus Server stores the incoming email reports and generates reports in csv format with summary information for the period for each device including total pages printed in colour and in monochrome; prints made; copies made; availability; etc.

Included with the Octopus Client is one or more Trap Server, also on the client network, which allows status monitoring of devices through SNMP traps.

Another program, known as "CASPAR" takes the form of a calculation software tool for the total cost of ownership. This provides a standardised structure for the input of site survey information and cost information, as well as standardised formats for the presentation of information and reporting.

A further program, known as "COMPASS", takes the form of a calculation and simulation software tool. It is a macro in Microsoft Excel, which takes an Excel spreadsheet output from CASPAR, and allows a manager to process this raw data through to the generation of transition documents which provide the managers with more meaningful information, to enable them to suggest ways of optimising the fleet of printing devices. The COMPASS operates predetermined algorithms to improve the raw data to produce the more meaningful information. This is a novel calculation and scenario analysis tool. It allows the manager to analyse the effect of proposed changes, using "what if" analysis on spreadsheets. For example, he can use this to optimise the time of phasing out an old machine and phasing in a replacement.

A further peripheral program provides a web portal, hosted remotely, and accessible on any of the servers 1020, 1030 where either the client's or the contractor's staff, appropriately authorised, are required to gain access to managed print information. The web portal has a standardised format for providing a visual display to management staff, as will be described below in greater detail.

Operational Processes for Management of Print Services

FIG. 4 shows a flow diagram of an overall generic operational process for the structured system. Initially, although not shown on FIG. 4, the contractor will of course make sales presentations to prospective clients, and these will include demonstrations of the operation of the management system and the functionality of the system including the web portal. This will include cost savings and improvements in efficiency. Although not shown, the managed print system provides the structure for the contractor's staff to monitor each detailed stage of this sales process, such as times of meetings and status of discussions and negotiations, and the system also provides appropriate documentation in standardised form, for use by the sales team and management.

Once a prospective client is willing to enter into a provisional commitment, with an expression of intention to enter into contractual relations, the roll out preparation process 100 begins. This is normally carried out at a "global level" i.e. by the contractor's staff responsible for an entire client: responsibility falls on a client manager and a project manager, within the contractor organisation. Locally, responsibility also falls on a country coordinator and an account manager, within the contractor's organisation.

Once the managed print contract (known as the "frame agreement") has been negotiated and agreed, the next stage is the site survey process 200. This involves both the client and the contractor in collecting all relevant information throughout the client organisation as to its existing printing devices and associated hardware, software and services, including all relevant financial information. Within the contractor's organisation, responsibility at this stage still rests with a client manager and a project manager at the global level; and with the country coordinator and a consulting manager, at the local level, for the region. Back office assistants, site surveyors and data entry operators, within the client or contractor organisation, will also be involved at this stage.

On completion of the site survey, the accumulated data are processed and reviewed by the contractor using CASPAR and COMPASS, to produce a solution which optimises the print services within the client organisation. As indicated already, this solution is likely to involve changes to the existing hardware and software, and replacement of some or all of the equipment and services.

Once this solution has been produced and agreed upon, the next stage is the site transition process 300. This is the transition from the client's existing arrangement to the optimised new arrangement, for print services. At the global level, the client manager and project manager remain responsible; at the local regional level, the country coordinator and a contract manager are responsible, within the contractor organisation; and an order entry executive also becomes involved.

On completion of the site transition process 300, the contract continues with the site management process 400, until expiry of the contract. During site management, there is regular provision and monitoring of information using the web portal, and a continuous process of optimisation and further cost saving. During site management, the client manager remains responsible at the global level, and an administrator becomes involved. At the local regional level, an account manager becomes responsible for the project locally, and the contract manager remains responsible for the processing. It is an important feature of the process that contract management is pro-active, continuously seeking to optimise the print service structure for the client. To this extent, processes and activities have been developed that support the contract manager in his proactivity.

For a typical contract, the roll out preparation process 100 might last five weeks; the site survey 200 might last eight, nine or ten weeks depending on the client organisation being small, medium or large; the site transition process 300 might last ten weeks; and the site management process 400 is continuous for the remainder of the contract term, which may for example be a total of five years.

Roll Out Preparation Process

Figure 11:
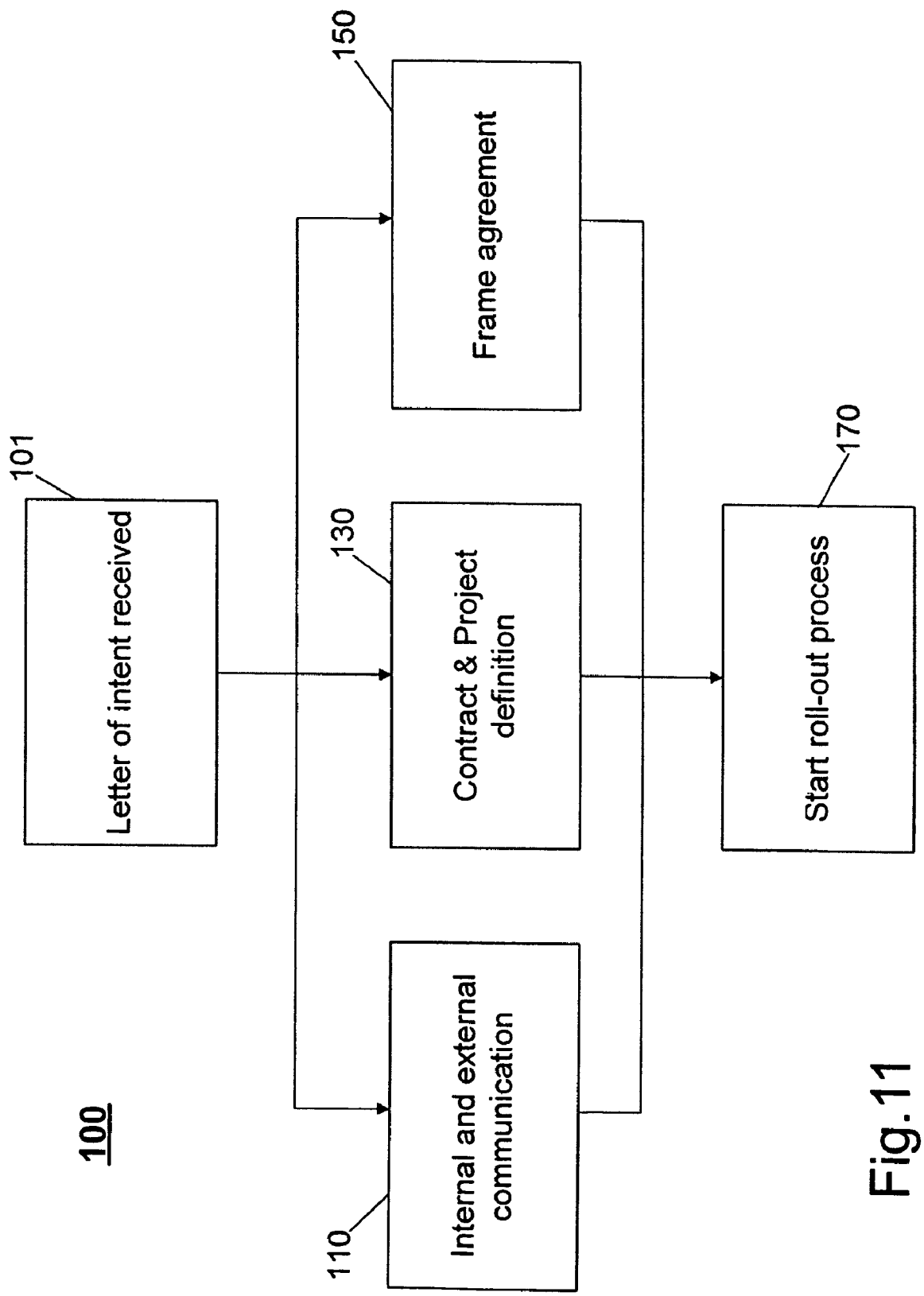
FIG. 11 is a flow diagram showing the roll out preparation process of FIG. 10.

The process is initiated by the step 101 of receiving a letter of intent, signed for the client and received by the contractor. The letter of intent uses a template stored on the system. The letter of intent includes agreed commercial terms, Service Level Agreements (SLAs) and processes. Internal and external communication stages 110, contract and project definition 130, and the framing of the agreement 150, take place before the start of the roll out process 170, with reference to FIG. 11.

Internally, members of the contractor's staff are appointed in the relevant roles, locally and globally.

External communication is carried out between the central i.e. global staff of the contractor and the new client, in order to contribute to the roll out preparation. The client designates country coordinators and site champions from its own staff.

The contract is defined with all the details of the contract relevant to the local organisations of the contractor, in order to be able to implement the contract locally according to the agreed standards. At the global level, the contractor's staff describe the way in which machines are to be pre-configured and delivered to local sites, with bundling and pricing information, and give cost indications and explain assumptions made; produce contact and information lists of relevant customer information for each site, and then provide an overview of all relevant details of the new contract.

The project is defined at the global and local level by the contractor's staff, who allocate the roles between them so as to implement the new contract according to the agreed standards. This includes defining operation project management rules, and producing tailor made site survey documents, reporting templates for the reporting of the cost base and the presentation of the proposal to the client. Even at this early stage, the "dashboard" described below with reference to FIG. 23, for use on the web portal, is prepared with all client information that is applicable, relevant and already available.

A template where parameters can be defined for how the cost base is to be calculated and parameters defined on which the proposal needs to be based, is shown in FIG. 12.

The contractor's local staff also assist in project definition by planning the roll out for each country and for each site, with agreed target dates for the site survey process 200 and the site transition process 300.

The step 150 of preparing the frame agreement is commenced by the production, by central staff with global responsibility, of a financial plan, including profit and loss (P&L) for the total contract, including the financial results of the roll out of the contract. Normally this must be preceded by execution of a letter of intent 101. An important part of the finalising of the agreement in step 150 is the client confirming the print environment, including the feasibility of the project, and also agreeing to allow access to the local networks 1010 for installation of the program tools and managed print software as appropriate.

The steps of negotiating the letter of intent 101 and the production of the frame agreement 150 are flexible, and can be merged.

The profit and loss projection and the frame agreement are both taken from templates stored on the system.

The roll out process is started at 170 only once it is confirmed throughout the contractor organisation that everything is ready to "go live" and that the client also agrees it is ready. The infrastructure for the managed print software has to be available and ready.

Site Survey

Figure 16:
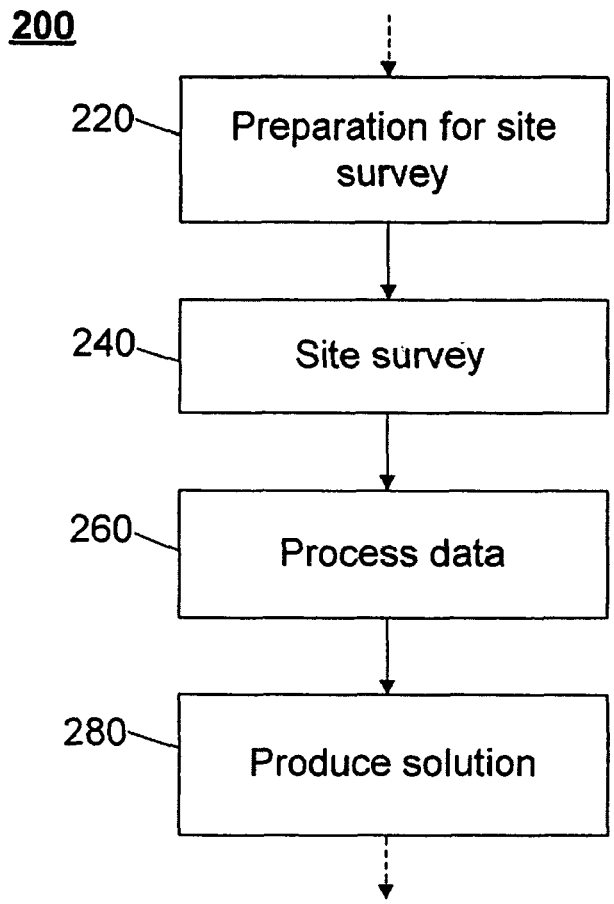
FIG. 16 is a flow diagram showing the site survey process of FIG. 10.

As shown in FIG. 16, the contractor regulates and controls the steps as follows: preparation for site survey 220 followed by the site survey 240 itself, followed by the processing of data 260 and the production of a solution 280 which is intended to optimise the print services throughout the client organisation.

In the site survey step 200, a site survey agreement, a client cost base document, together with a site transition template and a managed print software feasibility document, are all available as template documents from the system. At this step, as throughout the entire process, each detailed procedure is controlled and logged by the contractor, such as the agreement of target dates, the conveying of information between the client and the contractor, and the accumulation of surveyed information. The step of preparation for the site survey 220 includes a managed print software feasibility study which confirms the client's printing service environment, ensures that the client's IT environment can support the proposed solutions, and ensures and agrees the key software options. It also includes the development and signing of a site survey agreement. A tool box with all the necessary office and site survey supplies, and including documents according to the predetermined templates, is sent to the survey team which will be responsible for the site survey 240.

The actual physical survey of the site 240 is then carried out. FIGS. 30A and 30B together are an example of a template used for project management during the survey. The cost base shows the existing financial cost of the printing service on a site-by-site basis.

The data from the site survey are then processed 260 using the customer cost analysis, presentation and reporting software tool referred to above. This is done once the data for the cost base has been approved by both the client and the contractor. The software program forces the raw data to be presented in Excel spreadsheets in standardised form, for use as input for COMPASS, also referred to above.

FIG. 13 shows data generated automatically by CASPAR and COMPASS, representing the cost base of different types of equipment on site and showing cost per copy (ppc) with an analysis of percentage of copies done in colour.

The step of producing a solution 280 is carried out by the relevant staff member of the contractor, using COMPASS. The purpose of this stage is to optimise, using the human skills of the staff member together with the input CASPAR data and the stored database of relevant technical and financial information, a solution which is acceptable to the client and which is based on the parameters and goals that were agreed in the frame agreement in step 150.

FIG. 14 is a table generated automatically by COMPASS, as a Unit Migration Plan. It plans the phasing in and out of equipment including machines manufactured by the contractor and those from third parties.

FIG. 15 is a table generated automatically by COMPASS, showing a Saving Proposal, i.e. specifying cost savings from year to year—this will be a critical key point indicator.

During the production of a solution 280, the central/global responsibility is to coordinate and review optimisation proposals from staff with local responsibility, and to negotiate the proposals with the client, leading finally to confirmation of agreement to the solution proposal.

At the local level, during this phase 280, COMPASS is operated on the cost base data to produce more meaningful data which take account of the existing database of technical and financial information relating to the various hardware, software and services which may potentially be used for the print services. The member of staff with local responsibility for designing the solution has to produce a hardware solution, and to calculate the costs and savings of this solution proposal using COMPASS. He has to produce floor plans for the client's site, by scanning the floor plans provided by the client, drawing the current situation into the floor plan, and then drawing the new situation into the floor plan, i.e. after implementation of his proposal for optimisation. Alternatively, floor plans may be built using MS (Microsoft) Visio. He then has to produce a presentation of the solution proposal in a predetermined format such as that in FIGS. 14 and 15, and to submit this to the country or region coordinator. The country or region coordinator then judges the solution proposal from each site, and submits the presentations to the central or global manager for his approval. A customer site transition document, using a template from the system, is prepared, setting out the changes which are to be made if the solution is accepted. Third party purchase orders in the predetermined template are generated, in line with the proposal, once it has been agreed by the contractor at global responsibility level, and by the client.

Site Transition Process

Figure 17A:
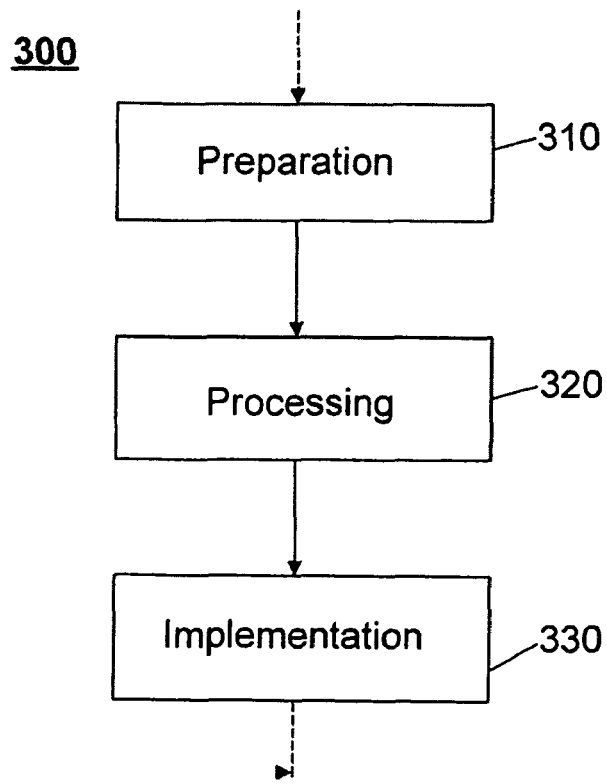
FIGS. 17a and 17b are sequential stages of the site transition process of FIG. 10.
Figure 17B:
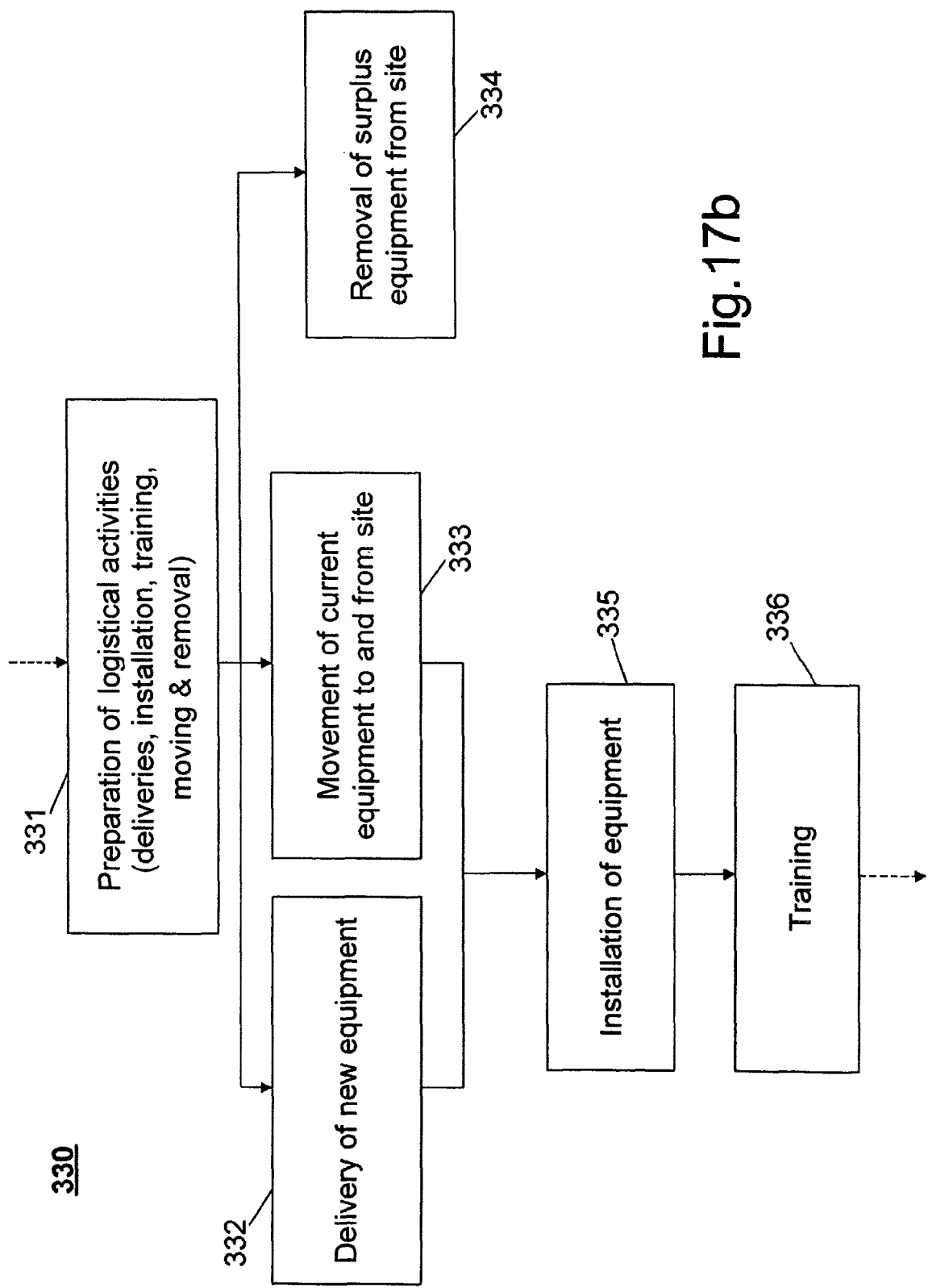

As shown in FIG. 17a, the site transition process 300 includes a preparation step 310, a processing step 320 and an implementation step 330, the last of these being shown in greater detail in FIG. 17b. The preparation stage 310 includes preparing all the activities that are necessary to process the agreed contract before optimising the print services, and all final negotiations are carried out with the client resulting in a signed contract and/or purchase order and an agreed site transition project document, taken from the system template. Staff with global responsibility review COMPASS and the site transition template, judge the agreed solution again, in case for example there are "slipped savings" i.e. savings missed by implementing a solution with a lower savings percentage than the potential savings percentage. With any adjustment to the agreed solution, approval is then given to the management with local i.e. country responsibility who then determine the timing of the site transition and report back to the central management.

At the local level, those with local responsibility procure a signed purchase order or contract, a signed site transition template, and a signed third party equipment purchase order. As part of the adjustment of the agreed solution, the COMPASS file with the agreed solution proposal is finalised, and any changes that have occurred between commencement of the site transition and this review stage must be incorporated in COMPASS before it can be approved centrally.

The processing step 320 includes ordering equipment such as printing devices from relevant suppliers, which may include the contractor itself. Local staff also produce implementation planning for the hardware and software, for logistics and for staff training. Service level agreements are processed, as previously agreed with the client. COMPASS is used to create a list of all new deliveries for the site implementation, a list of equipment that will remain in the same place, a list of equipment that is to be moved, and a list of equipment that is not to be retained and needs to be removed from the site. These lists include an indication of whether the equipment is leased or purchased and whether it is staying or moving.

The implementation step 330 includes physical delivery, installation and training for all hardware and software. The managed print software is installed on the network of the client and tested and approved, and appropriate training in the software is given. The implementation includes delivery of new equipment 332, movement of current equipment to and from the site 333, removal of surplus equipment from the site 334, installation of the equipment once it is in the correct position 335, and training 336 for the staff within the client organisation.

As part of this process, each site is audited by for example listing all meter readings of transitioned equipment and all other equipment on site, collecting and comparing the serial numbers on all items of equipment and verifying the correct locations of each device. Once all administrative tasks have been completed, then a final version of COMPASS is produced and sent to the central management staff who have global responsibility, so that they may verify the implemented solution and load the COMPASS data into the dashboard, for use later on the web portal. The loading of the dashboard is important, as it will be used in the site management process 400. In practice, a database resident on the central server 1000 stores the technical and financial data for the web portals including the dashboard, for each site, each region and globally for each client.

The FIG. 30B spreadsheet shows, by way of example, a financial proposal for use in the roll out preparation process 100, demonstrating cost savings for a five year contract. This assumes commencement of a contract during the calendar year 2003, for which savings are applicable only for six months. Once this proposal is agreed it forms part of the contract, and sets a target for cost savings. The contract can include terms for incentivising the contractor by adjusting its remuneration as a function of delivery of cost savings. In effect, the cost savings are shared between the contractor and the client. The effect of this is to increase or decrease the overall management fee paid by the client to the contractor. It will be appreciated that, in addition to the management fee, the contractor also obtains revenue from commission on sales of third party products, supplies and services.

Site Management Process

Figure 18:
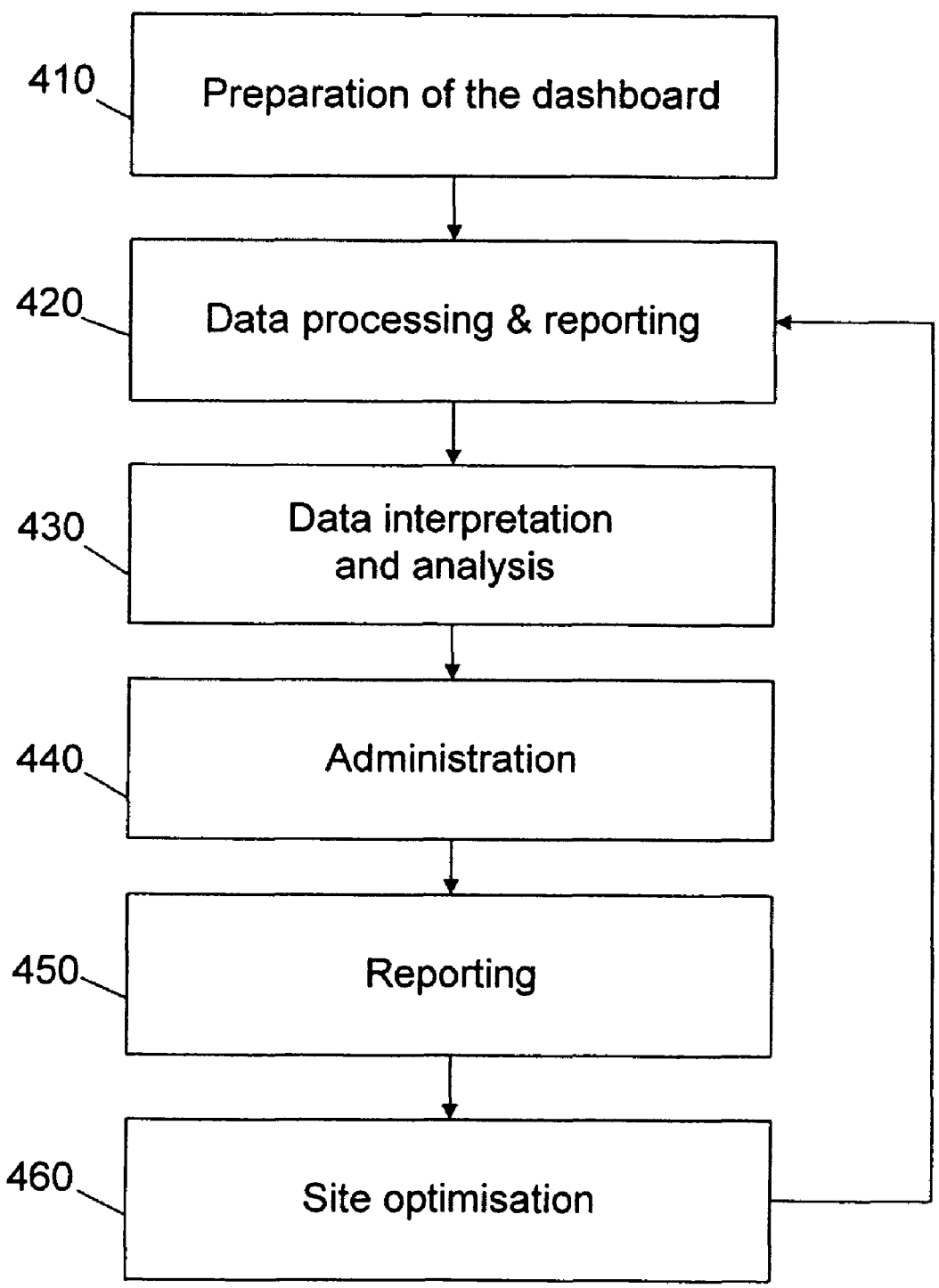
FIG. 18 is a flow diagram of the site management process of FIG. 10.

As shown in FIG. 18, the site management process 400 includes the step of preparation of the dashboard 410, whose content is then updated periodically to take account of changes that have been agreed and introduced; data processing and reporting 420; data interpretation and analysis 430; administration 440 which occurs throughout the stage; reporting 450 which is also done regularly, for example quarterly and yearly; and site optimisation 460 which is continuously ongoing with reporting carried out quarterly and review points implemented monthly. Overall client management is carried out by the contractor staff who have global responsibility, and these staff carry out data processing, data monitoring and client management functions. These staff are also responsible for the preparation of the dashboard 410. At the local level, site management is carried out by those with local responsibility, and these staff carry out steps 420 through to 460, using regular checking of the dashboard through their web portal.

Web Portal Including Dashboard

Figure 22:
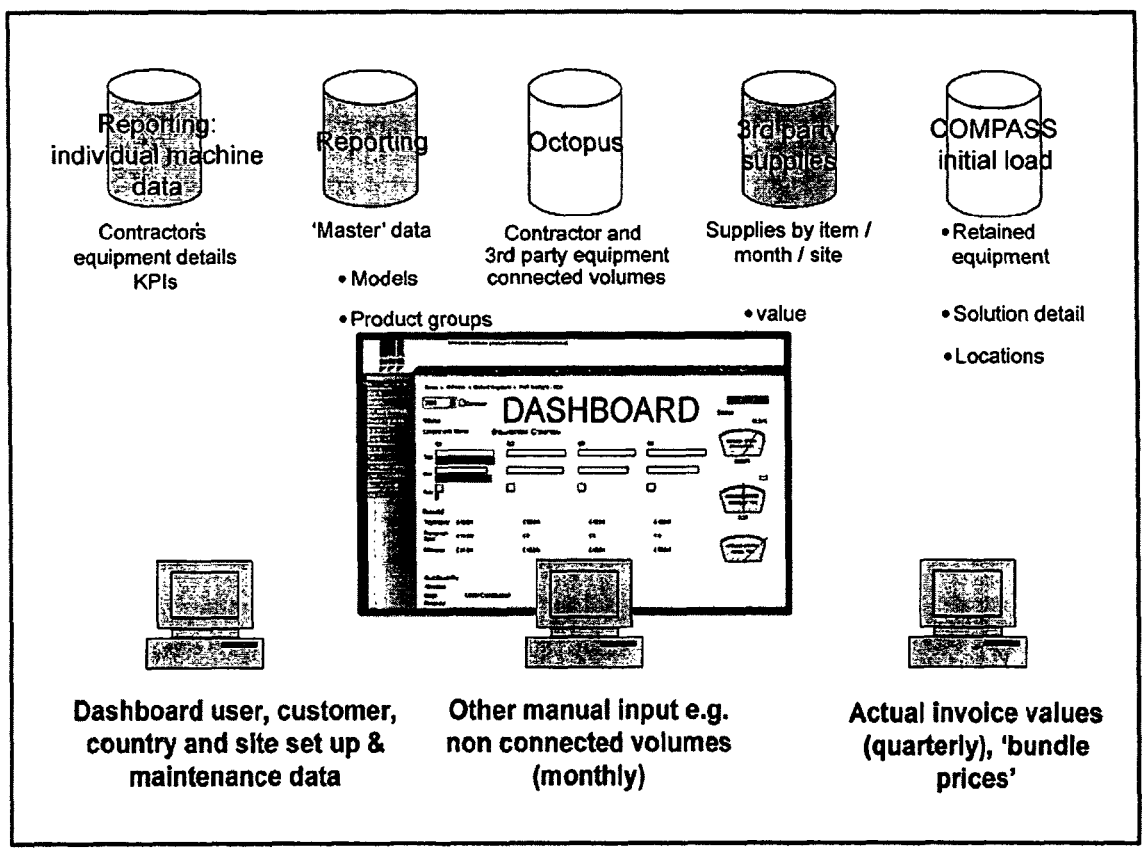
FIG. 22 is a diagram of inputs to the dashboard web portal.

The system includes a central database, as described above, which is populated with data for each client. FIG. 22 shows schematically the data sources for the web portal, of which one screen is the Dashboard. Data are automatically loaded from the databases shown in the upper half of FIG. 22; and there are manual inputs from the sources shown in the lower half.

Figure 20:
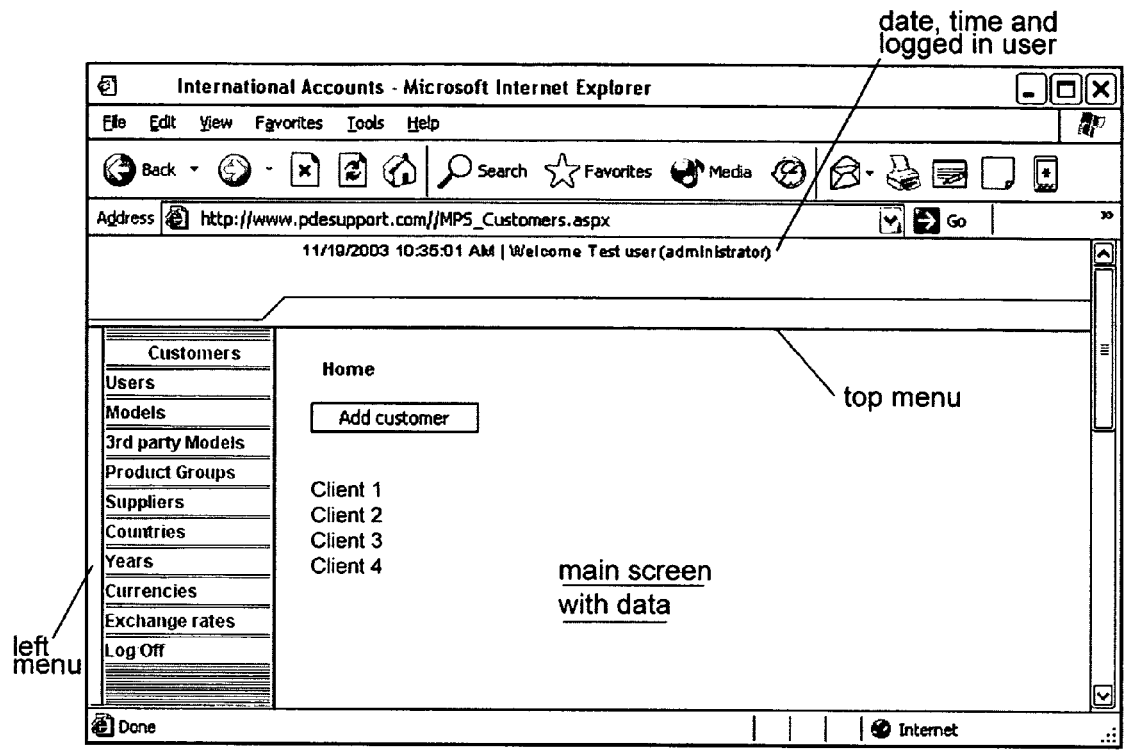
Figure 21:
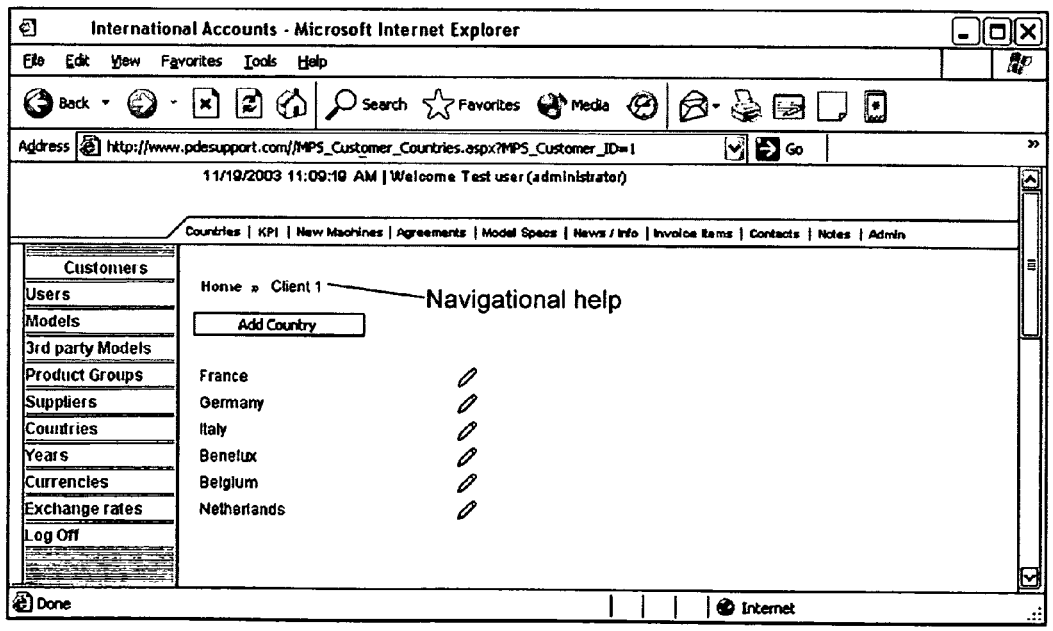

In this embodiment, the system uses Microsoft Internet Explorer as a browser. As shown in FIG. 20, the screen display through the web portal has the familiar Explorer layout, and it shows in this example a list of four clients' names, referred to on the screen as "customers". By selecting one of the clients, Client 1 as shown in FIG. 21, a drop down list of relevant regions is displayed; in this example, the regions comprise 6 countries. Data are provided in the HTML format in this example.

Figure 23:
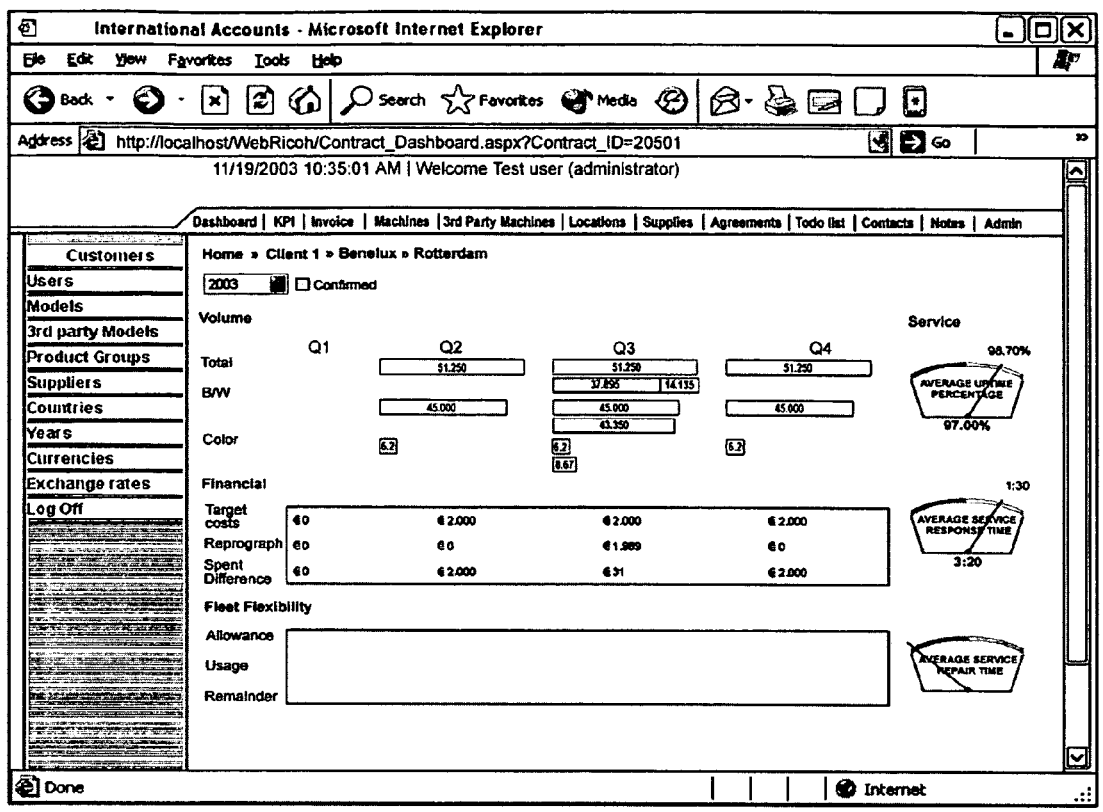

As shown in FIG. 23, one of the standardised screen displays takes the form of a dashboard, which includes meters resembling those on the dashboard of a car where they would indicate for example battery charge, fuel level and oil pressure level. This design is intended to maximise the visual impact and readability of the data presented on the screen, and to make it rewarding and attractive to users throughout the client organisation and the contractor organisation who are authorised to gain access to it.

The example shown in FIG. 23 is for client 1, in the region of Benelux, and for the Rotterdam site within that region. The different parts of the dashboard show performance of the print services overall for that site, against the predetermined key performance indicators which in this case are volume, financial, fleet flexibility and service. For each of the quarters Q1 to Q4, there are six volume blocks visible. The top bar shows the total volume of documents produced, for that quarter at that site, according to the previously agreed cost base. The second bar down shows the actual volume counterpart, i.e. the actual performance in volume terms. If the actual volume is lower than the cost base volume, the actual volume bar turns green, but otherwise the bar is red. Green therefore indicates desirable performance. Correspondingly, the third bar down shows black and white cost base volume, and the fourth bar down shows black and white actual volume. The fifth and sixth bars show cost base and actual volumes for colour documents.

Under the financial section, it will be understood that a central purpose of the managed print software is to keep control of the amount of money the client spends on its printing activities, and this is done by comparing the actual spend with the target costs. The target costs are calculated by taking the cost base costs (i.e. the cost before the transition process 300) and applying a savings percentage. If the process is going according to plan, this difference should be positive. These financial figures are shown for each quarter as target costs, reprographic spend, and difference ("reprographic" is intended to cover all print processes).

Under the fleet flexibility section, for each quarter, the predetermined allowance of print device capacity is indicated, and beneath that the actual usage is displayed. Beneath that, the difference is displayed as the "remainder" available for use.

On the right hand side of the dashboard, the three meters display performance in different aspects of service. The key performance indicators for service in this example are: average up-time percentage, average service response time and average service repair time. The service key performance indicators are visible as meters which turn to the green side (the right hand half of the meter) if they are within target levels, and turn to the red side (left hand side) if they are below target. The targets are indicated visibly underneath the meters: the actual values are above the meters, displayed either in red numerals on the left side, or in green numerals on the right side, depending on the performance. Thus the dial of the meter indicates actual performance for the relevant period, and should be in the green if the outcome is desirable.

The selection of key performance indicators is that which was agreed with the client, in the roll out preparation phase.

Users of the Dashboard may "drill down" to data previously entered in the database, such as individual machine basic data and configurations and usage volume.

Figure 24:
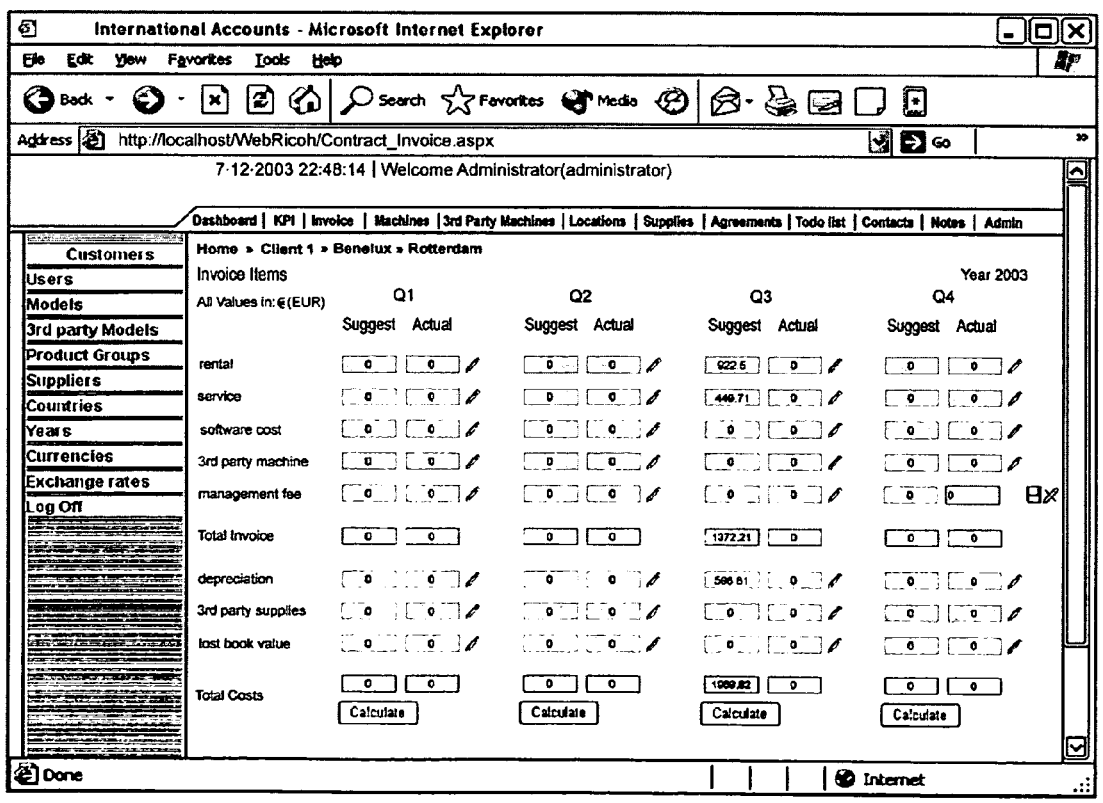

A further screen display is shown in FIG. 24, for invoice items once again for the Rotterdam office in Benelux of Client 1. For each contract, an invoice is "created" for each quarter: actual invoices are produced from the back office systems. The web portal has much information available, stored on the database, with which it can generate suggested values for this invoice. Items include rental costs, service charges, software costs, third party machine costs and management fee, with a subtotal of these items; followed by depreciation costs, costs of third party consumable supplies, and lost book values, with a final cost total at the end of each column, for each quarter as shown. On the left hand side of each column, a suggested invoice amount is generated by the system, and, following management intervention, an actual invoice amount is recorded in the right hand side. The service charge could be a function of the volume of documents, for example the volume in pages multiplied by the price per page. The software costs could be connected volume (in pages) multiplied by an optional software uplift per page. Lost book value is that for third party machines which are removed prior to the end of the depreciation date.

Figures 25, 26:
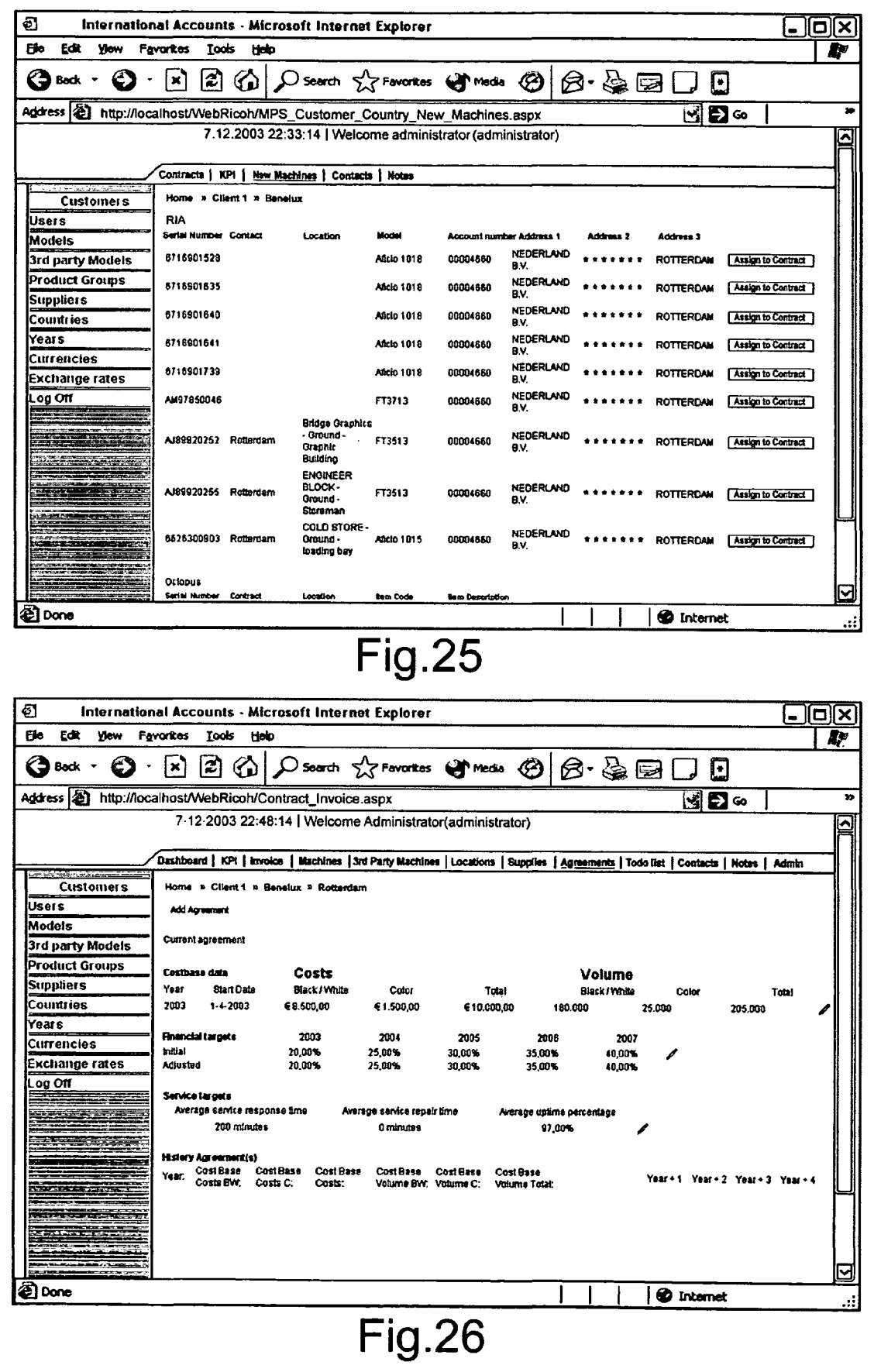

The screen display shown in FIG. 25 shows a list of machines, i.e. printing devices, together with their attributes and location. The interface for this screen for example allows the operator to enter new machines, in order to implement an optimisation strategy that has been approved.

As shown in FIG. 26, a screen display is used for indicating principal parts of a contract, at the regional or site level. In this example, for the Rotterdam office in Benelux of Client 1, the current agreement shows that the agreed commencement costs, forming the cost base data, were specific financial amounts for different types of document and specific volumes for those documents. Percentage cost savings are shown for annual financial targets. Service targets, in terms of the agreed key performance indicators, are shown further down the screen. Since the terms of contract can be adjusted during the period of the contract, by negotiation, the history of these parts of the agreement is recorded as shown at the bottom of the screen.

Figure 27:
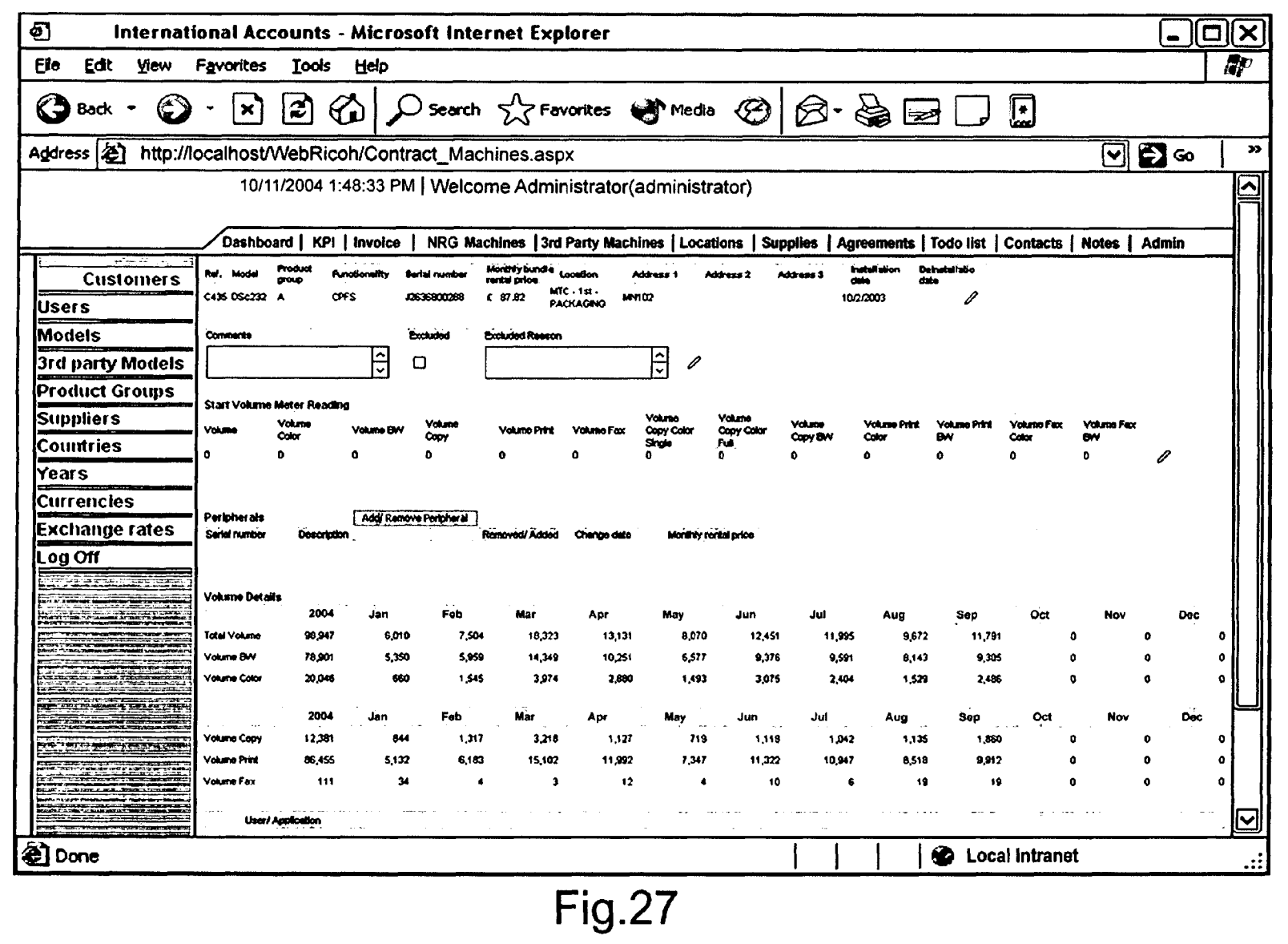
Figure 28:
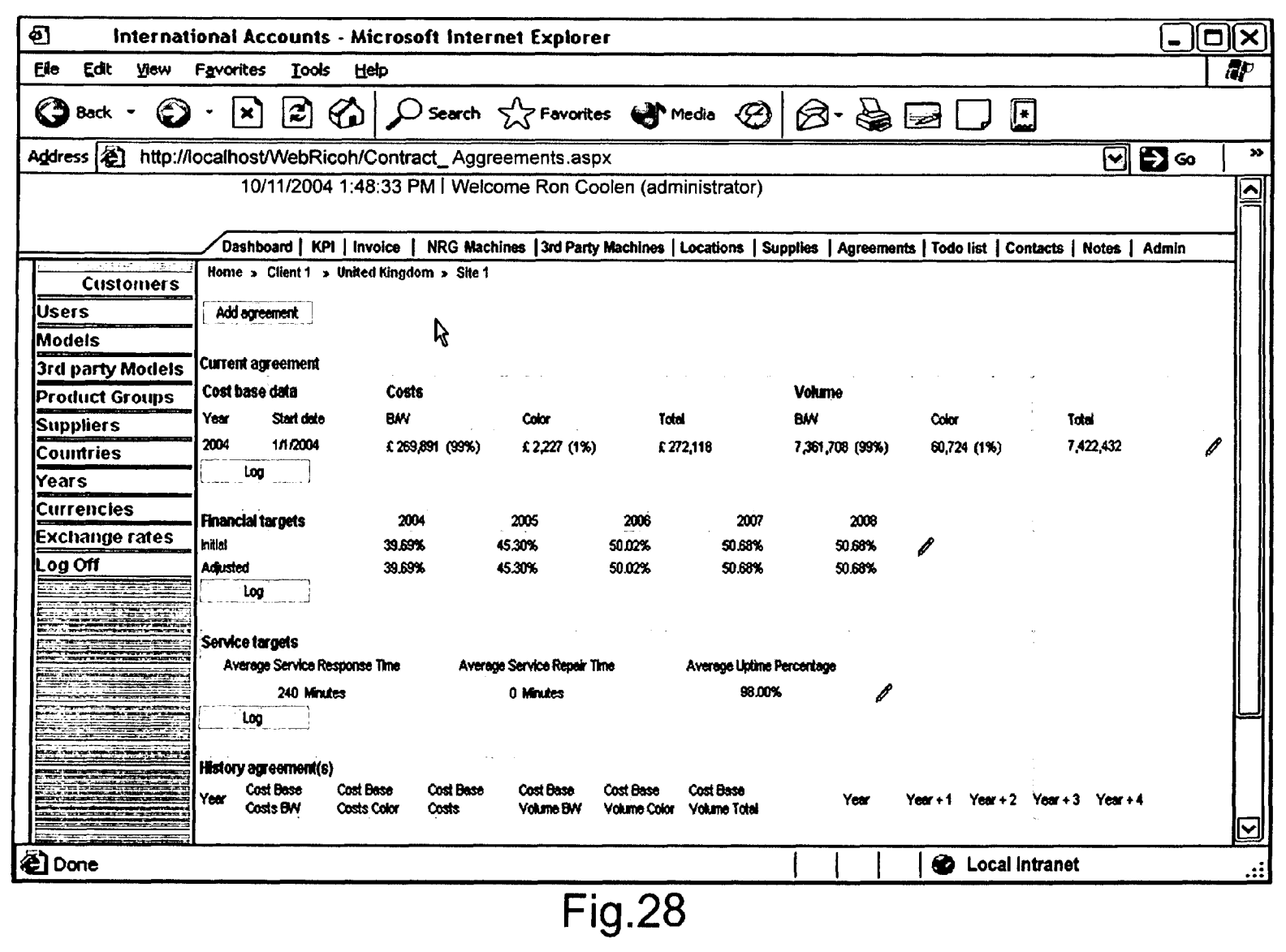
Figure 29A:
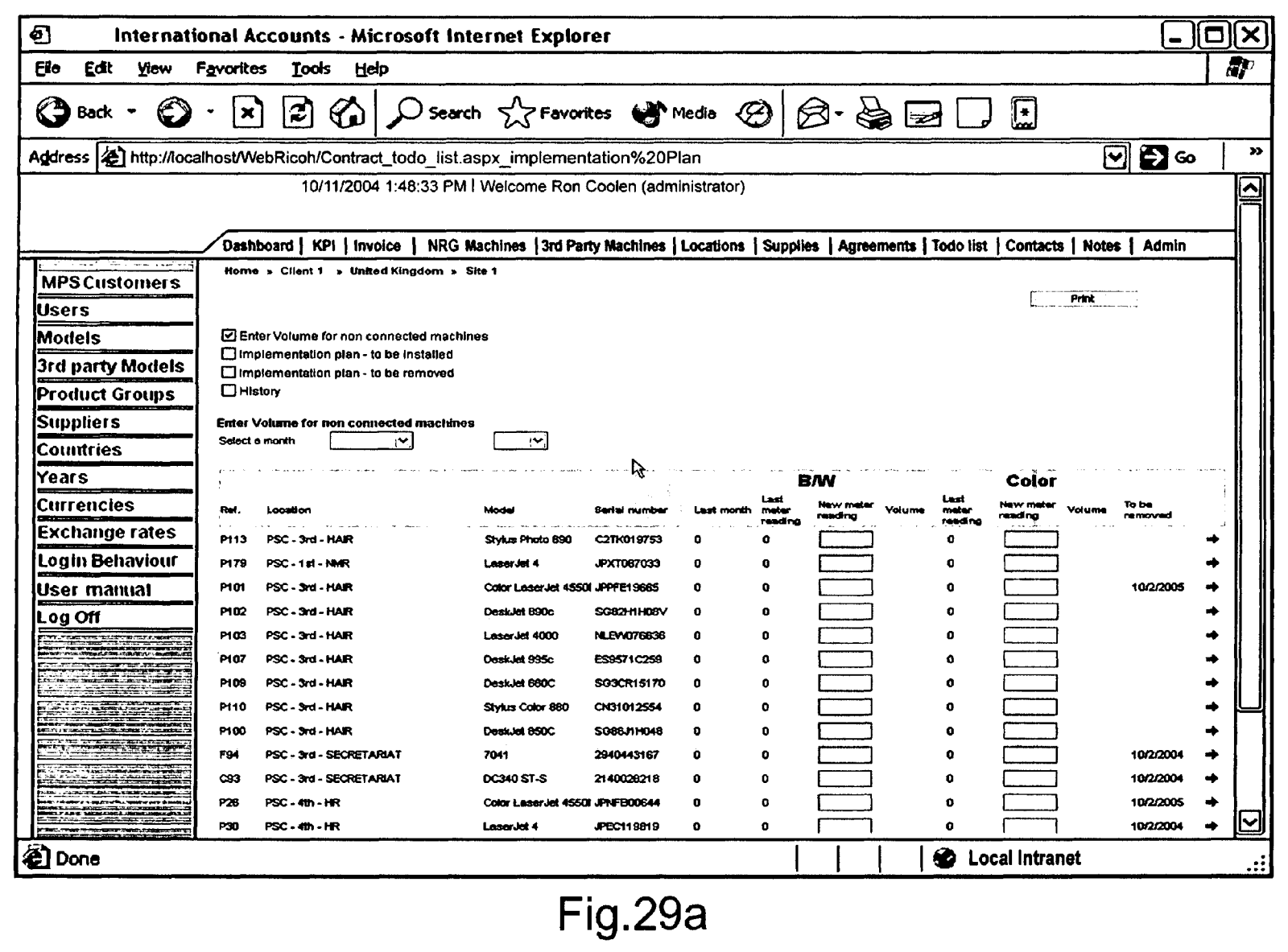
Figure 29B:
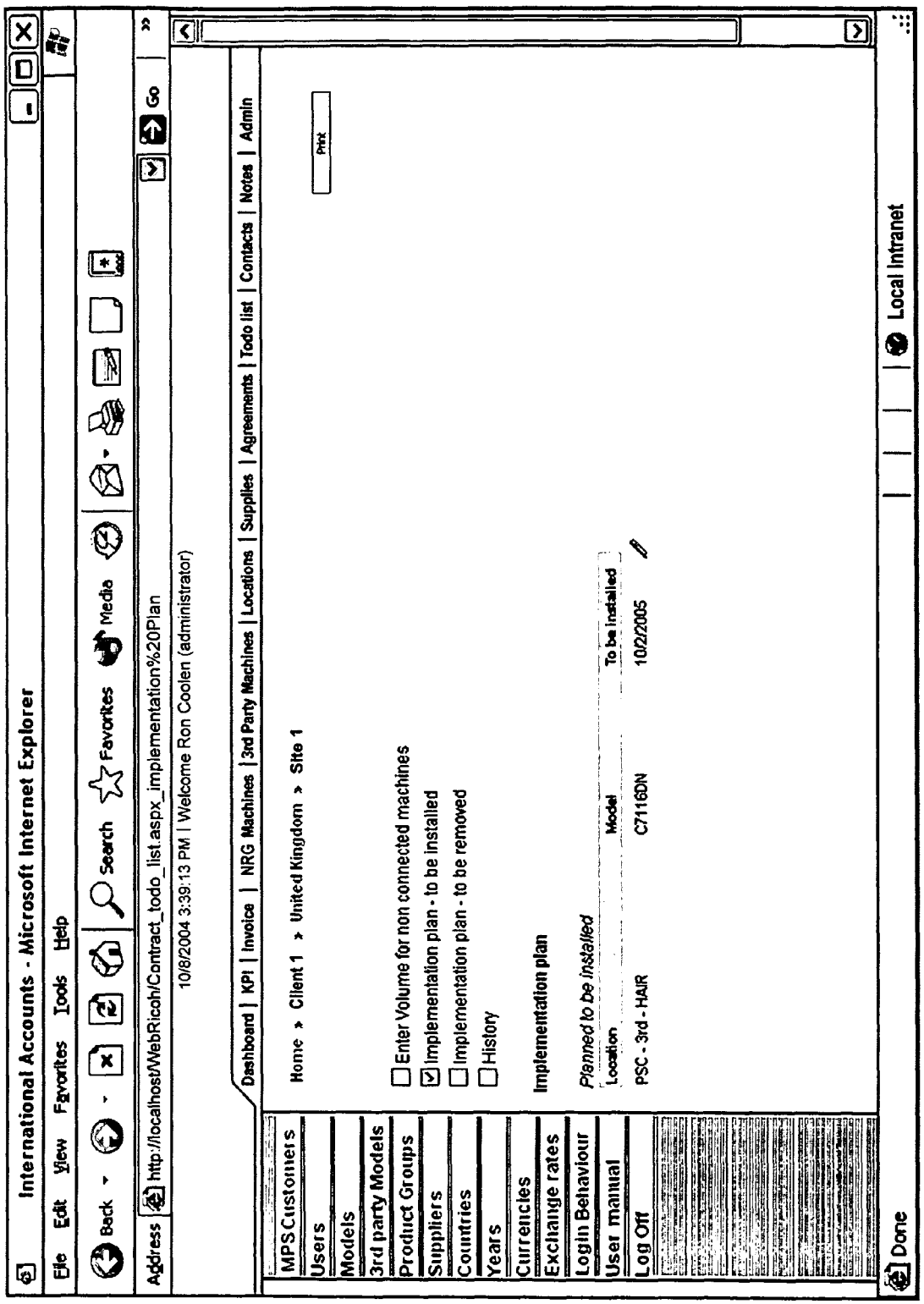
Figure 29C:
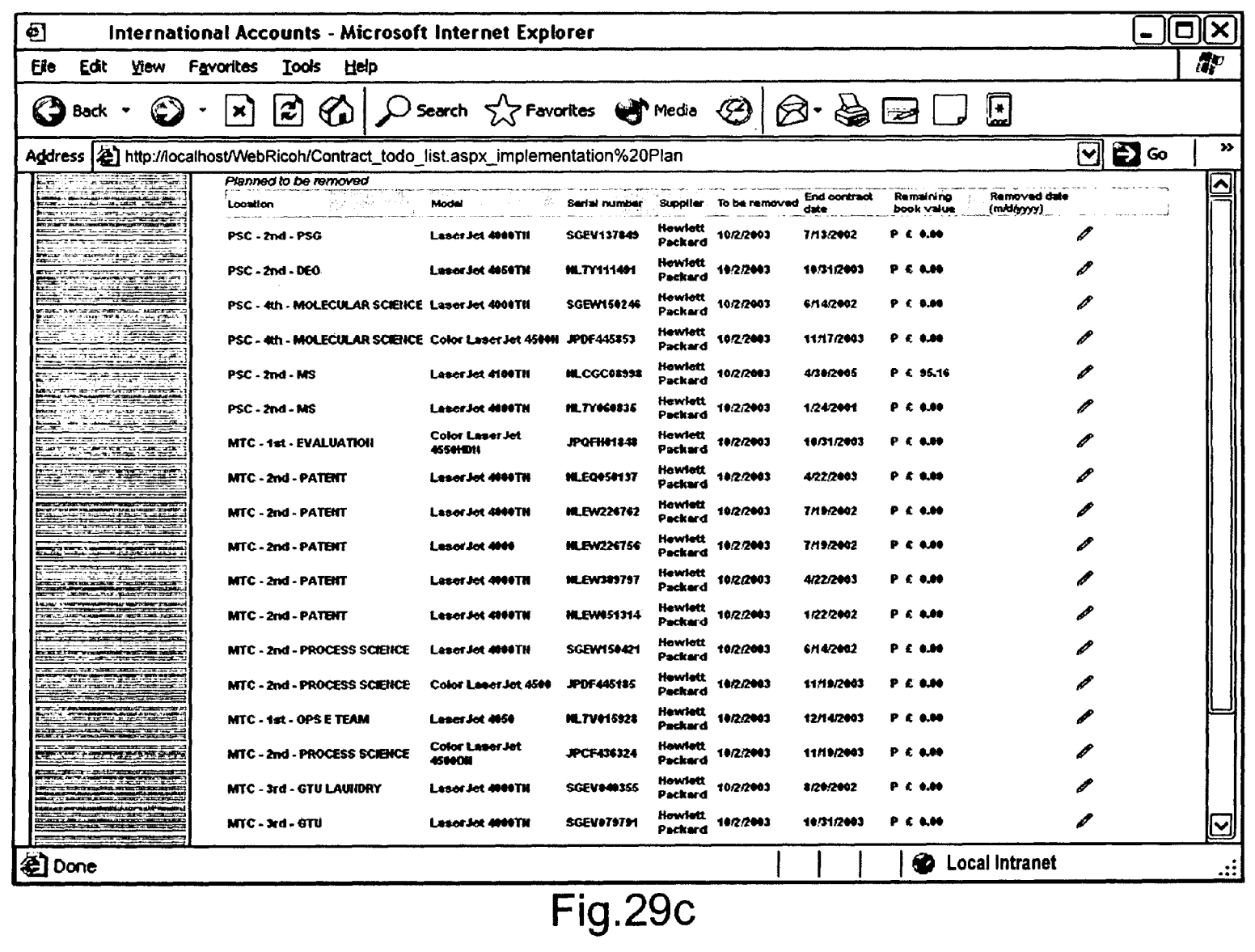

As shown in FIG. 27, meter readings at a machine level are displayed by the Portal. FIG. 28 shows a financial overview for Site 1 in the UK for Client 1, including the cost base data, financial and service targets and history agreements i.e. relevant contractual terms. FIGS. 29*a* to 29*c* show, for Site 1, the detailed action list or "to do list" for installation and removal of machines.

The data as displayed in the portal are directly derived from the COMPASS calculation tool. The calculation as imported into the portal represents the implemented solution.

One example of forming a new agreement is when a site is doubled in size, due to expansion of the business. A new agreement can then be made with a new cost base and new savings percentages. A new site survey could also be done at that time, and a new solution proposed and agreed. Once agreement has been reached for the new contract, the operator updates the database using the screen interface.

Preparation of the Dashboard

Staff with global responsibility for the client check a site transition template, verifying whether all machines and information are present, and all site transition activities in accordance with the site transition project plan have been carried out. The data from the contract are then added to the dashboard, using screen interfaces similar to those of FIGS. 24 to 26 described above. The finalised COMPASS file, based on the implemented solution, is then imported into the database which is used for the dashboard. Then all machine data, especially those from third parties, are checked for names and codes, against the list. This is to ensure that the audit is correct, including the software tools. Once data has been checked and errors corrected, local management is informed that the dashboard has been prepared.

The data stored in the database for use on the dashboard are kept up-to-date monthly, by those with global responsibility. The data, viewed through the web portal centrally and locally, are interpreted and processed in step 420 at least every month, and reports are generated. On a quarterly basis, the data are analysed and performance is compared with what was agreed with the client. The client is given quarterly and annual reports, comparing performance against targets, for each of the key performance indicators, including overall cost saving.

Site Management Process—Continued

The site optimisation 460 is an ongoing process.

FIG. 31 is a standardised template for data interpretation in step 430. This lists the criteria used in monitoring and assessing performance. In this example, the key performance indicators are average up time, average response time, average repair time, and machine level.

As shown in FIG. 32, there is a template for the data analysis carried out in step 430, and this specifies management issues which are to be discussed at quarterly or annual meetings; these are identified in the final section under "specifics".

FIG. 33 illustrates a template for an agenda for quarterly and annual reviews to be carried out by the management with global responsibility for a client.

FIG. 34 is a template used by site management for analysing the effect of a proposal for improving the print services. The optimisation proposals are listed on this template as option 1 to option 3, and in each case a description of the modification is given, together with the effect on the cost base and the target.

Figure 19:
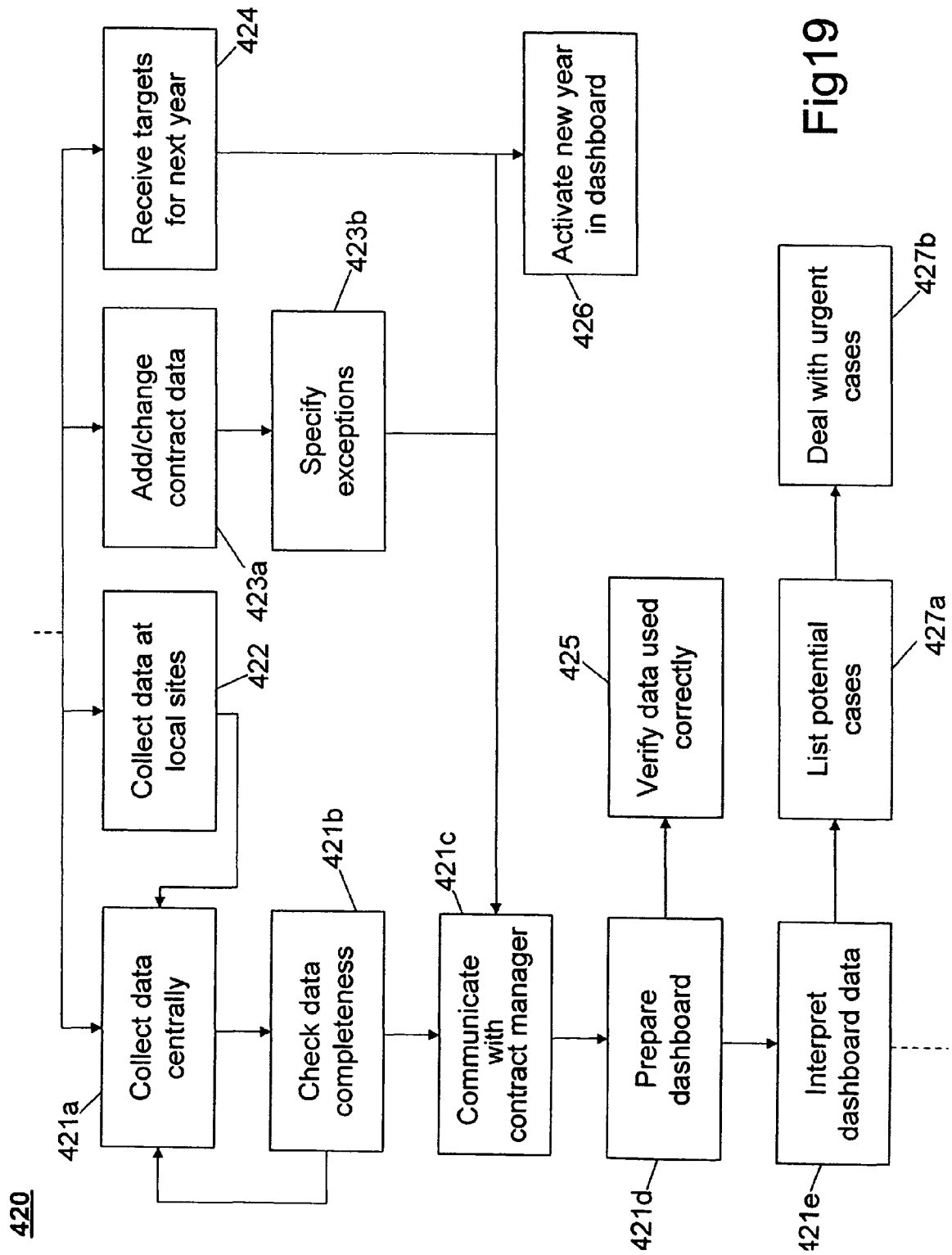
FIG. 19 is a more detailed flow diagram of the data processing and reporting step of the site management process shown in FIG. 18.

Part of the data processing step 420 is illustrated in FIG. 19. This includes the steps of collecting data centrally 421*a*, collecting data from local sites 422, and checking completeness of that data 421*b*, communicating the result to the contract manager 421*c* with central responsibility. In parallel, there is the step of adding or changing contract data 423*a*, specifying exceptions 423*b*, and feeding the results again to the contract manager. On an annual basis, new targets are developed by the contract manager and agreed with the client, and these are received for the forthcoming year in step 424. This also requires activation of the new year's dashboard in step 426.

As described above, it is the responsibility of the contract manager, or other appropriate staff with global responsibility, to prepare the dashboard 421*d* and keep it updated, as well as to verify that the data are used correctly, in step 425. The interpretation of the dashboard data 421*e* is an ongoing process, which local management use to provide a list of potential cases 427a for optimisation. This list of potential cases may include particularly urgent cases 427b, which are then dealt with with the approval of global management.

It will be understood that the management fee may be calculated in many different ways, in accordance with the terms of contract. It will include performance related bonuses based upon the client agreement, which may include sharing the cost savings, and penalties or bonuses from performance of key performance indicators against targets.

Further explanation will now be given of the management task for identifying possible improvements and providing proposals for optimisation. As a result of quarterly review meetings, data analysis, and/or client satisfaction survey results, the manager identifies a need for improvement, and checks that this need will be sustained. He then defines options for improvement and performs initial calculations, assessing the impact of particular defined solutions on potential gain. In the case of black and white to colour ratio changes, he would calculate the impact on the savings target. He incorporates any local influences that may affect potential options and choices, and makes a choice of the best options to follow, analysing them in greater detail. He then performs a final calculation or simulation to ensure that potential savings can be gained and to quantify them, analysing which of several options would be the best to implement. He then communicates his final choice to the site champion of the client, and, if the site champion agrees, then the proposal is communicated to the contract manager, for eventual implementation.

Implementation may for example include re-routing volumes, putting machines in different locations and implementing a new software solution, to ensure the right machines are in the right place and with the right functionality.

Floor plans are used, with standard templates, showing the arrangements of devices within each site.

On an ongoing basis, it is necessary for management to deal with service and support-related issues such as service escalations (response times, quality of reparation etc.); retraining of users; installation issues; and helpdesk issues.

Unification of Local and Global Management Service Roles

The rigorous structure of this management system has the benefit that it can be used for clients of all different sizes, whether they have just one office in one site, or plural sites in a country, or operations all over the world.

In the event that the client requires management services only in one region, for example one country, then the roles of global management and regional management for the contractor are merged. This is the case whether or not there are plural sites within the region. The merger of the roles is effected simply by assigning the same staff members both global and local roles.

The human resources of the contractor enterprise will be used in the most appropriate way, depending upon their geographical location and the needs of the clients served by the contractor. It is possible therefore for a manager in one local office to have only local responsibility for one client, but to have global responsibility for a different client. This is most likely to happen if the client's region coincides with the location of that staff member. Equally, it is possible for central staff always to be given the global responsibility for all clients, even though they may be geographically separated from the client's regions in some cases. Given that the servers are on the Internet or a wide area network, and that communications can be made readily by email and telephone for example, geographical separation is often insignificant, and the quarterly and annual meetings can still be carried out without undue burden on the staff members.

In the case of unified local and global roles, therefore, responsibility rests on one manager both for the setting up of the database for the web portal, and also the regular checking of the web portal during the site management phase. Also, it would be understood that several iterations of requesting and giving approval for changes will be eliminated, since the same person who proposes the changes will be empowered to authorise them.

The preferred embodiment of the invention meets several specific requirements of clients: for its organisation and implementation, it requires single face account management—so a single contractor meets this; it requires a global partner (contractor) with local representation, using standardised international processes; and it requires a contractor with a direct service organisation, and one to whom they can outsource their print room activities—the contractor could be an existing supplier of printing devices and services. Its finance and purchasing requirements could include: international pricing for hardware and service; guaranteed yearly savings; transparency overcost and savings; ongoing fleet management taking full account of its organisational and end-user changes; and standardised invoicing process supporting consolidated and predefined invoicing formats. Its product and fleet management software requirements include a minimized and standardized global product life cycle management process—met by the use of COMPASS—and a customized product delivery and installation process—met by the roll out process described, which is client specific, depending on the site survey. The system also manages third party products; provides transparency on the printing activities; and provides adequate management information to the client.

Though the specific embodiments described herein show particular implementations of the invention and demonstrate its advantages, other embodiments will be apparent from the description and the scope of protection sought herein is defined by the claims appended hereto with reference to the description and the drawings; no statement in this description should be interpreted as a specific limitation on the generality expressed in the claims.

The invention claimed is:

1. A process of management of printing devices at distributed sites, comprising providing a database portal accessible continuously, the portal giving a visual display of performance of the printing devices compared with predetermined targets for key performance indicators, further comprising:
   maintaining a database of information relating to each of the printing devices including its type, configuration and operational status as well as financial information relating to the cost of using the printing devices, and providing access to that database through the database portal;
   regularly updating the information database to take account of the way in which the printing devices are being used; and
   monitoring the performance of the printing devices against the key performance indicators and providing output information periodically; and using the output information to optimise the printing devices by making appropriate changes;
   wherein the process is carried out by a contractor for a client, in which the contractor provides total management of an entire fleet of the client's printing devices including phasing in and out printing devices of different manufacturing origin.

2. A management process according to claim 1, in which the key performance indicators include the cost of the fleet of printing devices.

3. A management process according to claim 1, in which the portal has a standardised format, across all sites and regions, and in which the said performance is the performance of the printing devices at the corresponding selected site or region, or globally for all regions, for the client.

4. A management process according to claim 1, in which the contractor is a manufacturer of printing devices and the process includes managing the fleet which comprises third-party-manufacturer printing devices.

5. A management process according to claim 4, comprising optimising the fleet by phasing in the contractor's own-manufactured printing devices at optimal times during a contract between the contractor and the client for the management of the fleet, consistent with minimising cost.

6. A management process according to claim 1, in which the portal gives a graphic display showing the performance of the printing devices selectively for a predetermined period and selectively for a site or a region of sites or globally for a client's fleet of printing devices.

7. A management process according to claim 6, in which a contractor provides the management process for at least one client and in which the portal is made available for management use by the client, with appropriate access restrictions, to enable the client to monitor the key performance indicators and to interrogate the database with printing device data.

8. A management process according to claim 6, in which the graphic display comprises meters which provide an immediate visual indication of the comparison of performance with the target, for each of two or more key performance indicators.

9. A management process according to claim 8, in which the meters are provided in the form of a dashboard resembling a motor vehicle dashboard.

10. A process of management of printing devices at distributed sites, comprising providing a database portal accessible continuously, the portal giving a visual display of performance of the printing devices compared with predetermined targets for key performance indicator, in which the portal gives a graphic display showing the performance of the printing devices selectively for a predetermined period and selectively for a site or a region of sites or globally for a client's fleet of printing devices, further comprising extracting data periodically from the printing devices and recording the data in a standardised format, the data including volumes of document production, performance, and consumption of consumables, and also extracting data relating to accounts information including the cost of the printing devices and the consumables, in which the graphic display shows the performance compared against the target for a plurality of the key performance indicators including: document volumes, using data from the database and extracted from the printing devices; financial cost of the operation of the fleet, using data from the database and extracted from a separate source of data relating to the cost of the printing devices and the consumables and all related hardware, software and services.

11. A management process according to claim 10, the graphic display showing performance compared against the target for services comprising average uptime, average service response time and average service repair time, for the printing devices.

12. A management process according to claim 10, comprising operating predetermined algorithms on the extracted data periodically to calculate more meaningful output data, to facilitate the management of the fleet in order to propose changes to optimise the fleet, and including supplying some or all of the more meaningful output data for the graphic display.

* * * * *